US007728997B2

(12) United States Patent
Koike et al.

(10) Patent No.: US 7,728,997 B2
(45) Date of Patent: Jun. 1, 2010

(54) DIGITAL COPYING MACHINE, IMAGE FORMATION SYSTEM, AND DIGITAL COPYING MACHINE AS SLAVE MACHINE

(75) Inventors: Moriyuki Koike, Tokyo (JP); Hiroshi Mori, Tokyo (JP); Hisashi Ishiguro, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 833 days.

(21) Appl. No.: 11/079,169

(22) Filed: Mar. 15, 2005

(65) Prior Publication Data
US 2005/0151996 A1 Jul. 14, 2005

Related U.S. Application Data

(62) Division of application No. 09/672,852, filed on Sep. 29, 2000, now Pat. No. 7,167,256.

(30) Foreign Application Priority Data
Sep. 30, 1999 (JP) ................................. 11-280716
Sep. 6, 2000 (JP) .............................. 2000-270836

(51) Int. Cl.
G06F 3/12 (2006.01)
G06F 15/00 (2006.01)
G06G 15/00 (2006.01)
(52) U.S. Cl. .................... 358/1.15; 358/1.13; 358/1.14; 358/1.16; 399/8; 399/9; 709/208; 709/209; 709/201
(58) Field of Classification Search ....... 358/1.11–1.16, 358/444; 709/201, 203; 711/100, 101, 104, 711/105, 111, 112; 710/1, 2, 12, 22, 23, 710/52, 68, 312–315; 399/8–11, 81–87, 399/114, 296, 401
See application file for complete search history.

(56) References Cited

U.S. PATENT DOCUMENTS 4,797,706 A * 1/1989 Sugishima et al. .......... 358/300

(Continued)

FOREIGN PATENT DOCUMENTS

EP 0-774710 5/1997

(Continued)

OTHER PUBLICATIONS

U.S. Appl. No. 11/078,400, filed Mar. 14, 2005, Koike et al.

(Continued)

Primary Examiner—Twyler L Haskins
Assistant Examiner—Chad Dickerson
(74) Attorney, Agent, or Firm—Oblon, Spivak, McClelland, Maier & Neustadt, L.L.P.

(57) ABSTRACT

A digital copying machine is connected to at least another one of digital copying machines with which data communications can be performed. The digital copying machine has a link copy function that a document is set in the machine itself or another digital copying machine and at least two units of the digital copying machines share the job of executing copy operation on the document, and a printer function of printing according to a print request from the outside. When receiving the print request from the outside during the copy operation based on the link copy function from its start to finish, the digital copying machine puts the print request on hold.

7 Claims, 25 Drawing Sheets

U.S. PATENT DOCUMENTS

| | | | |
|---|---|---|---|
| 5,287,194 A * | 2/1994 | Lobiondo | 358/296 |
| 5,490,260 A | 2/1996 | Miller et al. | |
| 5,511,150 A | 4/1996 | Beaudet et al. | |
| 5,689,755 A | 11/1997 | Ataka | |
| 5,740,497 A * | 4/1998 | Yamada et al. | 399/87 |
| 5,809,363 A * | 9/1998 | Kitamura et al. | 399/8 |
| 5,812,747 A * | 9/1998 | Kayano et al. | 358/1.15 |
| 5,901,276 A * | 5/1999 | Murahashi et al. | 358/1.13 |
| 5,963,717 A * | 10/1999 | Imamura | 358/1.15 |
| 5,970,224 A * | 10/1999 | Salgado et al. | 358/1.16 |
| 5,987,227 A | 11/1999 | Endo et al. | |
| 6,043,897 A | 3/2000 | Morikawa et al. | |
| 6,078,759 A * | 6/2000 | Satake et al. | 399/8 |
| 6,130,757 A * | 10/2000 | Yoshida et al. | 358/1.15 |
| 6,167,209 A | 12/2000 | Suzuki et al. | |
| 6,338,767 B1 | 1/2002 | Nakatani et al. | |
| 6,388,767 B1 | 5/2002 | Udagawa et al. | |
| 6,449,064 B1 * | 9/2002 | Hattori et al. | 358/403 |
| 6,930,793 B1 | 8/2005 | Namizuka et al. | |
| 7,190,284 B1 | 3/2007 | Dye et al. | |
| 2002/0018244 A1 | 2/2002 | Namizuka et al. | |

FOREIGN PATENT DOCUMENTS

| | | |
|---|---|---|
| EP | 0-820185 | 1/1998 |
| EP | 0-899942 | 3/1999 |
| JP | 8-163292 | 6/1996 |
| JP | 10-143026 | 5/1998 |
| JP | 10-153928 | 6/1998 |
| JP | 11-88570 | 3/1999 |

OTHER PUBLICATIONS

U.S. Appl. No. 11/078,429, filed Mar. 14, 2005, Koike et al.
U.S. Appl. No. 11/079,261, filed Mar. 15, 2005, Koike et al.

* cited by examiner

DIGITAL COPYING MACHINE, IMAGE FORMATION SYSTEM, AND DIGITAL COPYING MACHINE AS SLAVE MACHINE

CROSS-REFERENCE TO RELATED APPLICATIONS

This application is a divisional application of, and claims priority to, Ser. No. 09/672,852 filed Sep. 29, 2000 and claims priority to Japanese Patent Applications 11-280716 filed Sep. 30, 1999 and 2000-270836 filed on Sep. 6, 2000.

FIELD OF THE INVENTION

The present invention relates to a digital copying machine, an image formation system, and a slave machine in the image system. More particularly, this invention relates to a digital copying machine, an image formation system, and a slave machine in the image system, in which a plurality of digital copying machines can share and execute one job.

BACKGROUND OF THE INVENTION

In recent years, digital copying machines have been in common use, and transfer of image data between the digital copying machines is becoming possible. Further, there has been proposed a technology that a plurality of digital copying machines share one job of copying for the purpose of improving productivity. For example, "A plurality of copying devices linked through electric signal means" disclosed in JP, H08-163292A is known as a technology of using linked digital copying devices.

In this "A plurality of copying devices linked through electric signal means", the technology of performing data communications between digital copying devices connected to each other with a simple configuration is disclosed. This technology is realized based on a plurality of linked copying devices. Each of the copying devices comprises a scanner unit for scanning an image and a printer unit for recording connected to the scanner unit through an electric signal means, and a digital image control unit. The plurality of the digital copying machines are connected to each other using the respective digital image control units through electric signal means. Further, each of the plurality of the linked copying devices comprises a receiving unit that receives an image data signal generated by the scanner unit, a switching unit used to exchange the image data signal, and a transfer unit that transfers the image data signal.

In the "A plurality of copying devices linked through electric signal means" disclosed in JP, H08-163292A, although the technology of performing data communications between copying devices connected with a simple configuration has been proposed, when the connected copying machines are to be used, there is disadvantage that each operational environment in consideration of the machine usage status and operation priorities of each user can not be provided.

SUMMARY OF THE INVENTION

It is an object of this invention to provide a digital copying machine, an image formation system, and a digital copying machine as a slave machine, that can improve productivity in consideration of the machine usage status and operation priorities of each user.

In order to solve the problems, the present invention provides an image formation system formed with at least two units of digital copying machines connected to each other and in which a plurality of the connected digital copying machines can share and execute one job. Each of the digital copying machines has a link copy function that a document is set in one of digital copying machines and at least two units of the digital copying machines share the job of executing copy operation on the document, and a printer function of printing according to a print request from the outside. When receiving the print request from the outside during the copy operation based on the link copy function from its start to finish, the digital copying machine puts the print request on hold.

According to this invention, each of the digital copying machines has the link copy function that a document is set in one of digital copying machines and at least two units of the digital copying machines share the job of executing copy operation on the document, and the printer function of printing according to the print request from the outside. When receiving the print request from the outside during the copy operation based on the link copy function from its start to finish, the digital copying machine puts the print request on hold.

In the present invention, each of the digital copying machines permits printer operation for a print request from the outside during the interruption when the copy operation based on the link copy function is interrupted after the operation is started and before being finished. According to this invention, when the copy operation based on the link copy function is interrupted after the operation is started and before being finished, each of the digital copying machines permits printer operation for a print request from the outside during the interruption.

In the present invention, each of the digital copying machines does not permit printer operation for a print request from the outside during the interruption when the copy operation based on the link copy function is interrupted after the operation is started and before being finished. According to this invention, when the copy operation based on the link copy function is interrupted after the operation is started and before being finished, each of the digital copying machines does not permit printer operation for a print request from the outside during the interruption.

In the present invention, each of the digital copying machines can set permission or non-permission to execute printer operation for a print request from the outside during the interruption when the copy operation based on the link copy function is interrupted after the operation is started and before being finished. According to this invention, when the copy operation based on the link copy function is interrupted after the operation is started and before being finished, each of the digital copying machines can set permission or non-permission to execute printer operation for a print request from the outside during the interruption.

In the present invention, the digital copying machine executes the printer operation according to the print request put on hold after the copy operation based on the link copy function is finished. According to this invention, the digital copying machine executes the printer operation according to the print request put on hold after the copy operation based on the link copy function is finished.

The present invention provides a digital copying machine connected to at least another one of digital copying machines with which data communications can be performed. The digital copying machine has a link copy function that a document is set in the machine itself or another digital copying machine and at least two units of the digital copying machines share the job of executing copy operation on the document, and a printer function of printing according to a print request from the outside. When receiving the print request from the outside during the copy operation based on the link copy function from its start to finish, the digital copying machine puts the print request on hold.

According to this invention, the digital copying machine has the link copy function that a document is set in the machine itself or another digital copying machine and at least two units of the digital copying machines share the job of executing copy operation on the document, and the printer function of printing according to a print request from the outside. When receiving the print request from the outside during the copy operation based on the link copy function from its start to finish, the digital copying machine puts the print request on hold.

The present invention permits printer operation for a print request from the outside during the interruption when the copy operation based on the link copy function is interrupted after the operation is started and before being finished. According to this invention, when copy operation based on the link copy function is interrupted after the operation is started and before being finished, the digital copying machine permits printer operation for a print request from the outside during the interruption.

The present invention does not permit printer operation for a print request from the outside during the interruption when the copy operation based on the link copy function is interrupted after the operation is started and before being finished. According to this invention, when the copy operation based on the link copy function is interrupted after the operation is started and before being finished, the digital copying machine does not permit printer operation for a print request from the outside during the interruption.

The present invention can set permission or non-permission to execute printer operation for a print request from the outside during the interruption when the copy operation based on the link copy function is interrupted after the operation is started and before being finished. According to this invention, when the copy operation based on the link copy function is interrupted after the operation is started and before being finished, the digital copying machine can set permission or non-permission to execute printer operation for a print request from the outside during the interruption.

In the present invention, the digital copying machine executes the printer operation according to the print request put on hold after the copy operation based on the link copy function is finished. According to this invention, the digital copying machine executes the printer operation according to the print request put on hold after the copy operation based on the link copy function is finished.

The present invention provides an image formation system formed with at least two units of digital copying machines connected to each other and in which a plurality of the connected digital copying machines can share and execute one job. Each of the digital copying machines has a link copy function that a document is set in one of digital copying machines and at least two units of the digital copying machines share the job of executing copy operation on the document, and a printer function of printing according to a print request from the outside. When the start of copy operation based on the link copy function is instructed during the printer operation according to the print request from the outside, the digital copying machine interrupts the printer operation to start the copy operation based on the link copy function.

According to this invention, each of the digital copying machines has the link copy function that a document is set in one of digital copying machines and at least two units of the digital copying machines share the job of executing copy operation on the document, and the printer function of printing according to a print request from the outside. When the start of copy operation based on the link copy function is instructed during the printer operation according to the print request from the outside, the digital copying machine interrupts the printer operation to start the copy operation based on the link copy function.

The present invention provides an image formation system formed with at least two units of digital copying machines connected to each other and in which a plurality of the connected digital copying machines can share and execute one job. Each of the digital copying machines has a link copy function that a document is set in one of digital copying machines and at least two units of the digital copying machines share the job of executing copy operation on the document, and a printer function of printing according to a print request from the outside. When the start of copy operation based on the link copy function is instructed during the printer operation according to the print request from the outside, the digital copying machine waits until the printer operation is finished and starts the copy operation based on the link copy function after the printer operation is finished.

According to this invention, each of the digital copying machines has the link copy function that a document is set in one of digital copying machines and at least two units of the digital copying machines share the job of executing copy operation on the document, and the printer function of printing according to a print request from the outside. When the start of copy operation based on the link copy function is instructed during the printer operation according to the print request from the outside, the digital copying machine waits until the printer operation is finished and starts the copy operation based on the link copy function after the printer operation is finished.

The present invention provides an image formation system formed with at least two units of digital copying machines connected to each other and in which a plurality of the connected digital copying machines can share and execute one job. Each of the digital copying machines has a link copy function that a document is set in one of digital copying machines and at least two units of the digital copying machines share the job of executing copy operation on the document, and a printer function of printing according to a print request from the outside. When the start of copy operation based on the link copy function is instructed during the printer operation according to the print request from the outside, the digital copying machine displays a message to the effect that the printer is operating and also a menu screen used to instruct a following operation to be executed. When Interrupt is selected in the menu screen, the digital copying machine interrupts the printer operation to start the copy operation based on the link copy function. When Wait is selected, the digital copying machine waits until the printer operation is finished and starts the copy operation based on the link copy function after the printer operation is finished. Further, when Cancel is selected, the digital copying machine cancels the copy operation based on the link copy function.

According to this invention, each of the digital copying machines has the link copy function that a document is set in one of digital copying machines and at least two units of the digital copying machines share the job of executing copy operation on the document, and the printer function of printing according to a print request from the outside. When the start of copy operation based on the link copy function is instructed during the printer operation according to the print request from the outside, the digital copying machine displays a message to the effect that the printer is operating and also a menu screen used to instruct a following operation to be executed. When Interrupt is selected in the menu screen, the digital copying machine interrupts the printer operation to start the copy operation based on the link copy function. When Wait is selected, the digital copying machine waits until the printer operation is finished and starts the copy operation based on the link copy function after the printer operation is finished. Further, when Cancel is selected, the digital copying machine cancels the copy operation based on the link copy function.

In the present invention when the printer operation according to the print request from the outside has ended during displaying of the menu screen, the digital copying machine dismisses the menu screen to start the copy operation based on the link copy function. According to this invention, when the printer operation according to the print request from the outside has ended during displaying of the menu screen, the digital copying machine dismisses the menu screen to start the copy operation based on the link copy function.

The present invention provides a digital copying machine connected to at least another one of digital copying machines with which data communications can be performed. The digital copying machine has a link copy function that a document is set in the machine itself or another digital copying machine and at least two units of the digital copying machines share the job of executing copy operation on the document, and a printer function of printing according to a print request from the outside. When the start of copy operation based on the link copy function is instructed during the printer operation according to the print request from the outside, the digital copying machine interrupts the printer operation to start the copy operation based on the link copy function.

According to this invention, the digital copying machine has the link copy function that a document is set in the machine itself or another digital copying machine and at least two units of the digital copying machines share the job of executing copy operation on the document, and the printer function of printing according to a print request from the outside. When the start of copy operation based on the link copy function is instructed during the printer operation according to the print request from the outside, the digital copying machine interrupts the printer operation to start the copy operation based on the link copy function.

The present invention provides a digital copying machine connected to at least another one of digital copying machines with which data communications can be performed. The digital copying machine has a link copy function that a document is set in the machine itself or another digital copying machine and at least two units of the digital copying machines share the job of executing copy operation on the document, and a printer function of printing according to a print request from the outside. When the start of copy operation based on the link copy function is instructed during the printer operation according to the print request from the outside, the digital copying machine waits until the printer operation is finished and starts the copy operation based on the link copy function after the printer operation is finished.

According to this invention, the digital copying machine has the link copy function that a document is set in the machine itself or another digital copying machine and at least two units of the digital copying machines share the job of executing copy operation on the document, and the printer function of printing according to a print request from the outside. When the start of copy operation based on the link copy function is instructed during the printer operation according to the print request from the outside, the digital copying machine waits until the printer operation is finished and starts the copy operation based on the link copy function after the printer operation is finished.

The present invention provides a digital copying machine connected to at least another one of digital copying machines with which data communications can be performed. The digital copying machine has a link copy function that a document is set in the machine itself or another digital copying machine and at least two units of the digital copying machines share the job of executing copy operation on the document, and a printer function of printing according to a print request from the outside. When the start of copy operation based on the link copy function is instructed during the printer operation according to the print request from the outside, the digital copying machine displays a message to the effect that the printer is operating and also a menu screen used to instruct a following operation to be executed. When Interrupt is selected in the menu screen, the digital copying machine interrupts the printer operation to start the copy operation based on the link copy function. When Wait is selected, the digital copying machine waits until the printer operation is finished and starts the copy operation based on the link copy function after the printer operation is finished. Further, when Cancel is selected, the digital copying machine cancels the copy operation based on the link copy function.

According to this invention, the digital copying machine has the link copy function that a document is set in the machine itself or another digital copying machine and at least two units of the digital copying machines share the job of executing copy operation on the document, and the printer function of printing according to a print request from the outside. When the start of copy operation based on the link copy function is instructed during the printer operation according to the print request from the outside, the digital copying machine displays the message to the effect that the printer is operating and also the menu screen used to instruct a following operation to be executed. When Interrupt is selected in the menu screen, the digital copying machine interrupts the printer operation to start the copy operation based on the link copy function. When Wait is selected, the digital copying machine waits until the printer operation is finished and starts the copy operation based on the link copy function after the printer operation is finished. Further, when Cancel is selected, the digital copying machine cancels the copy operation based on the link copy function.

In the present invention when the printer operation according to the print request from the outside has ended during displaying of the menu screen, the digital copying machine dismisses the menu screen to start the copy operation based on the link copy function. According to this invention, when the printer operation according to the print request from the outside has ended during displaying of the menu screen, the digital copying machine dismisses the menu screen to start the copy operation based on the link copy function.

The present invention provides an image formation system formed with at least two units of digital copying machines connected to each other, each of which has a link copy function that a digital copying machine determined as a master machine scans an image of a document as an object to be copied and transfers the image of the scanned document to at least another one of the digital copying machines as a slave machine, and that the master machine and the slave machine share the job of printing the scanned document image. The master machine has a printer function of printing according to a print request from the outside, and when the start of copy operation based on the link copy function is instructed during the printer operation according to the print request from the outside, the master machine interrupts the printer operation and preferentially executes the copy operation. On the other hand, the slave machine has a printer function of printing according to a print request from the outside, and even when the start of copy operation based on the link copy function is instructed during the printer operation according to the print request from the outside, the slave machine continues to execute the printer operation.

According to this invention, the master machine has the printer function of printing according to a print request from the outside, and when the start of copy operation based on the link copy function is instructed during the printer operation according to the print request from the outside, the master machine interrupts the printer operation and preferentially executes the copy operation. On the other hand, the slave machine has the printer function of printing according to a print request from the outside, and even when the start of copy operation based on the link copy function is instructed during the printer operation according to the print request from the outside, the slave machine continues to execute the printer operation.

The present invention provides a digital copying machine as a slave machine connected to a digital copying machine as a master machine. The slave machine has a link copy function that the slave machine receives an image of a document scanned and transferred by the master machine and shares the job of printing the scanned document image with the master machine. The slave machine also has a printer function of printing according to a print request from the outside, and even when the start of copy operation based on the link copy function is instructed during the printer operation according to the print request from the outside, the slave machine continues to execute the printer operation.

According to this invention, the slave machine has the printer function of printing according to a print request from the outside, and even when the start of copy operation based on the link copy function is instructed during the printer operation according to the print request from the outside, the slave machine continues to execute the printer operation.

The present invention provides an image formation system formed with at least two units of digital copying machines connected to each other, each of which has a link copy function that a digital copying machine determined as a master machine scans an image of a document as an object to be copied and transfers the image of the scanned document to at least another one of the digital copying machines as a slave machine, and that the master machine and the slave machine share the job of printing the scanned document image. The master machine has a printer function of printing according to a print request from the outside, and when receiving the print request from the outside during the copy operation based on the link copy function from its start to finish, the master machine puts the print request on hold. On the other hand, the slave machine has a printer function of printing according to a print request from the outside, and when receiving the print request from the outside during the copy operation based on the link copy function from its start to finish, the slave machine preferentially executes the printer operation according to the print request.

According to this invention, the master machine has the printer function of printing according to a print request from the outside, and when receiving the print request from the outside during the copy operation based on the link copy function from its start to finish, the master machine puts the print request on hold. On the other hand, the slave machine has the printer function of printing according to a print request from the outside, and when receiving the print request from the outside during the copy operation based on the link copy function from its start to finish, the slave machine preferentially executes the printer operation according to the print request.

The present invention provides a digital copying machine as a slave machine connected to a digital copying machine as a master machine. The slave machine has a link copy function that the slave machine receives an image of a document scanned and transferred by the master machine and shares the job of printing the scanned document image with the master machine. The slave machine also has a printer function of printing according to a print request from the outside, and when receiving the print request from the outside during the copy operation based on the link copy function from its start to finish, the slave machine preferentially executes the printer operation according to the print request.

According to this invention, the slave machine has the printer function of printing according to a print request from the outside, and when receiving the print request from the outside during the copy operation based on the link copy function from its start to finish, the slave machine preferentially executes the printer operation according to the print request.

The present invention provides an image formation system formed with at least two units of digital copying machines connected to each other, each of which has a link copy function that a digital copying machine determined as a master machine scans an image of a document as an object to be copied and transfers the image of the scanned document to at least another one of the digital copying machines as a slave machine, and that the master machine and the slave machine share the job of printing the scanned document image. The master machine has a printer function of printing according to a print request from the outside, and when receiving the print request from the outside during the copy operation based on the link copy function from its start to finish, the master machine puts the print request on hold. On the other hand, the slave machine has a printer function of printing according to a print request from the outside, and when receiving the print request from the outside during the copy operation based on the link copy function from its start to finish, the slave machine stops the copy operation and executes the printer operation according to the print request.

According to this invention, the master machine has the printer function of printing according to a print request from the outside, and when receiving the print request from the outside during the copy operation based on the link copy function from its start to finish, the master machine puts the print request on hold. On the other hand, the slave machine has the printer function of printing according to a print request from the outside, and when receiving the print request from the outside during the copy operation based on the link copy function from its start to finish, the slave machine stops the copy operation and executes the printer operation according to the print request.

The present invention provides a digital copying machine as a slave machine connected to a digital copying machine as a master machine. The slave machine has a link copy function that the slave machine receives an image of a document scanned and transferred by the master machine and shares the job of printing the scanned document image with the master machine. The slave machine also has a printer function of printing according to a print request from the outside, and when receiving the print request from the outside during the copy operation based on the link copy function from its start to finish, the slave machine stops the copy operation and executes the printer operation according to the print request.

According to this invention, the slave machine has the printer function of printing according to a print request from the outside, and when receiving the print request from the outside during the copy operation based on the link copy function from its start to finish, the slave machine stops the copy operation and executes the printer operation according to the print request.

The present invention provides an image formation system formed with at least two units of digital copying machines connected to each other, each of which has a link copy function that a digital copying machine determined as a master machine scans an image of a document as an object to be copied and transfers the image of the scanned document to at least another one of the digital copying machines as a slave machine, and that the master machine and the slave machine share the job of printing the scanned document image. The master machine has a printer function of printing according to a print request from the outside, and when receiving the print request from the outside during the copy operation based on the link copy function from its start to finish, the master machine puts the print request on hold. On the other hand, the slave machine has a printer function of printing according to a print request from the outside, and when receiving the print request from the outside during the copy operation based on the link copy function from its start to finish, the slave machine interrupts the copy operation and executes the printer operation according to the print request.

According to this invention, the master machine has the printer function of printing according to a print request from the outside, and when receiving the print request from the outside during the copy operation based on the link copy function from its start to finish, the master machine puts the print request on hold. On the other hand, the slave machine has the printer function of printing according to a print request from the outside, and when receiving the print request from the outside during the copy operation based on the link copy function from its start to finish, the slave machine interrupts the copy operation and executes the printer operation according to the print request.

The present invention provides a digital copying machine as a slave machine connected to a digital copying machine as a master machine. The slave machine has a link copy function that the slave machine receives an image of a document scanned and transferred by the master machine and shares the job of printing the scanned document image with the master machine. The slave machine also has a printer function of printing according to a print request from the outside, and when receiving the print request from the outside during the copy operation based on the link copy function from its start to finish, the slave machine interrupts the copy operation and executes the printer operation according to the print request.

According to this invention, the slave machine has the printer function of printing according to a print request from the outside, and when receiving the print request from the outside during the copy operation based on the link copy function from its start to finish, the slave machine interrupts the copy operation and executes the printer operation according to the print request.

In the present invention each of the digital copying machines outputs images printed by printer operation and images printed by copy operation based on the link copy function to different paper output sections. According to this invention, each of the digital copying machines outputs images printed by printer operation and images printed by copy operation based on the link copy function to different paper output sections.

In the present invention, at least two units of the digital copying machines are directly connected to each other. According to this invention, at least two units of digital copying machines are directly connected to each other.

In the present invention, at least two units of the digital copying machine are connected to each other through a network. According to this invention, at least two units of digital copying machines are connected to each other through a network.

In the present invention, the digital copying machine outputs images printed by printer operation and images printed by copy operation based on the link copy function to different paper output sections. According to this invention, the digital copying machine outputs images printed by printer operation and images printed by copy operation based on the link copy function to different paper output sections.

In the present invention, the digital copying machine is directly connected to at least another one of the digital copying machines. According to this invention, the digital copying machine is directly connected to at least another one of digital copying machines.

In the present invention, the digital copying machine is connected to at least another one of the digital copying machines through a network. According to this invention, the digital copying machine is connected to at least another one of digital copying machines through a network.

In the present invention, the slave machine outputs images printed by printer operation and images printed by copy operation based on the link copy function to different paper output sections. According to this invention, the slave machine outputs images printed by printer operation and images printed by copy operation based on the link copy function to different paper output sections.

In the present invention, the slave machine is directly connected to the master machine. According to this invention, the slave machine is directly connected to the master machine.

In the present invention, the slave machine is connected to the master machine through a network. According to this invention, the slave machine is connected to the master machine through a network.

Preferred embodiments of the digital copying machine, the image formation system, and the digital copying machine as a slave machine according to the present invention are explained in detail below in order of (First Embodiment), (Second Embodiment), and (Third Embodiment) with reference to the attached drawings.

Other objects and features of this invention will become understood from the following description with reference to the accompanying drawings.

DESCRIPTION OF THE PREFERRED EMBODIMENTS

The image formation system and the digital copying machine according to a first embodiment will be explained below in order of [Schematic configuration of the image formation system in the first embodiment], [Configuration of the digital copying machine], [Control system of the digital copying machine (First example of the configuration) and (Second example of the configuration)], [Image processing unit of the digital copying machine], [Control section of the digital copying machine], [Example of connection between digital copying machines (Hardware configuration)], [Explanation and definition of terms], [First example of operations: (link copy operation) and (Printer operation)], and [Second example of operations: (link copy operation) and (Print operation)].

Figure 1:
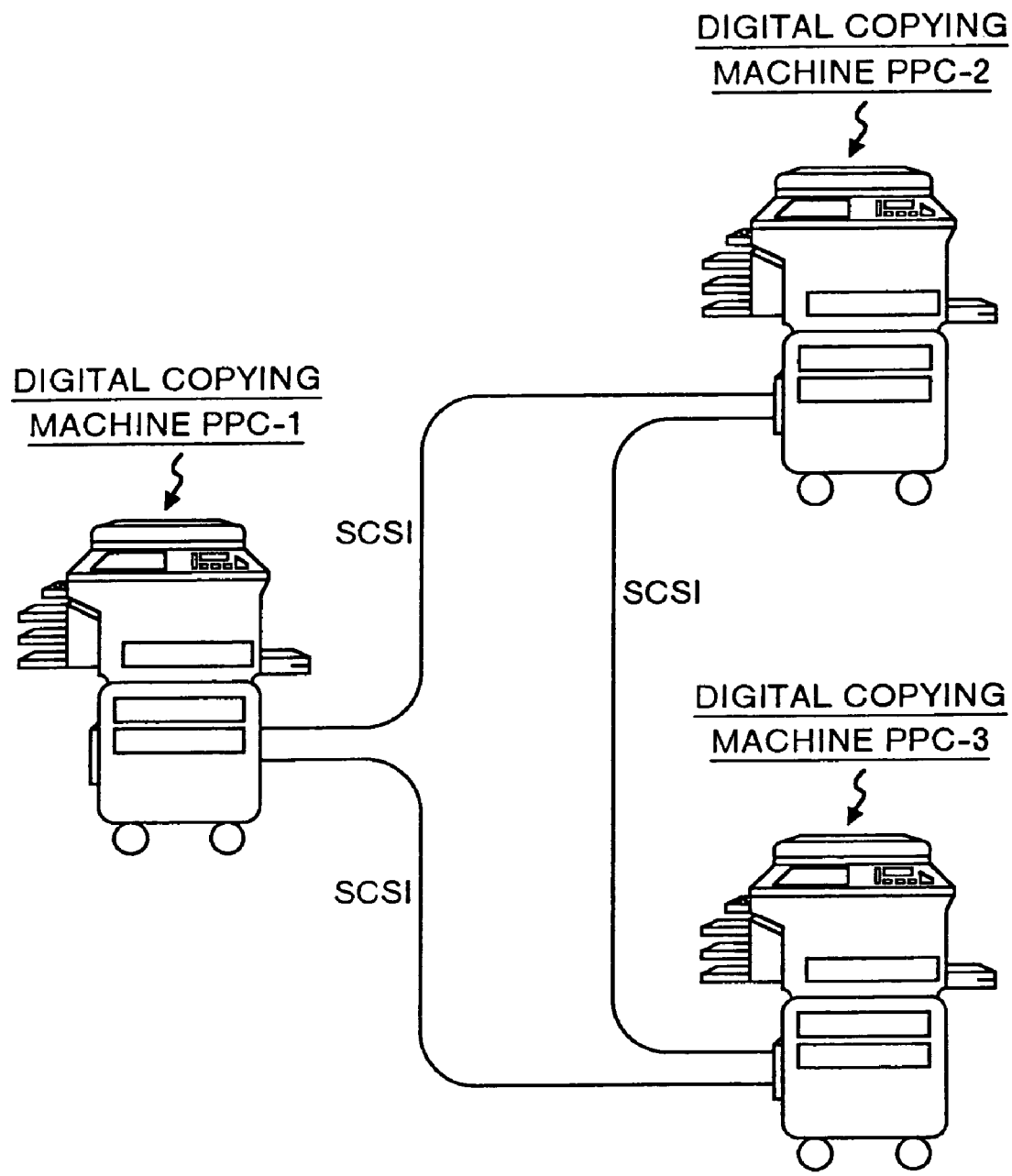
FIG. 1 shows an example of the configuration of the image formation system according to the first embodiment.

FIG. 1 shows an example of the configuration of the image formation system according to the first embodiment. The image formation system shown in FIG. 1 comprises a digital copying machine PPC-1, a digital copying machine PPC-2, and a digital copying machine PPC-3. These digital copying machines PPC-1, PPC-2, and PPC-3 are connected to one another through respective SCSIs. Each of the digital copying machines PPC-1, PPC-2, and PPC-3 has the same configuration as one another. This example of the configuration of the image formation system assumes a system in which a plurality of digital copying machines are installed at locations close to one another.

Personal computers or the like not shown, each of which issues a print request, are connected to the digital copying machines PPC-1, PPC-2, and PPC-3. Each of the digital copying machines PPC-1, PPC-2, and PPC-3 has a link copy function (link copy mode) that a document is set in any of the digital copying machines and at least two units of the digital copying machines share the job of executing copy operation on the document, and a printer function (print mode) of printing according to a print request from the outside (e.g., personal computer).

Each of the digital copying machines PPC-1, PPC-2, and PPC-3 has a link copy key to allow mode to shift to the link copy mode. When the link copy key is pressed, each of the digital copying machines sets the link copy mode based on setting of the machine itself as a master machine, and transmits a link request to a specified digital copying machine. The digital copying machine, that has received the link request, sets the link copy mode based on setting of the machine itself as a slave machine. That is, the machine whose link copy key is pressed is determined as a master machine, and the machine that receives a link request is determined as a slave machine. A document is set in the master machine, and the master machine and the slave machine share the job of copying the image of the scanned document. Each of the digital copying machines PPC-1, PPC-2, and PPC-3 can function as a master machine and a slave machine for any of the other machines.

For example, when the digital copying machine PPC-2 is specified as a target to be linked by the digital copying machine PPC-1 and the link copy key is pressed, the digital copying machine PPC-1 sets the link copy mode based on the machine itself as a master machine and transmits a link request to the digital copying machine PPC-2. The digital copying machine PPC-2 receives the link request and sets the link copy mode based on the machine itself as a slave machine. A document is set in the digital copying machine PPC-1, and the digital copying machine PPC-1 and the digital copying machine PPC-2 share the job of copying the image of the scanned document. Although the case where the digital copying machine PPC-2 is set as a slave machine is explained here, it is needless to say that the digital copying machine PPC-2 and the digital copying machine PPC-3 may be set as slave machines and the three digital copying machines may share and execute the copy job. Further, although the case where three digital copying machines are connected is explained in FIG. 1, this invention is not limited by this case. Therefore, any number of units to be connected may be allowable, and also any number of digital copying machines may share and execute the link copy job.

The operation in the case where the link copy job conflicts with the printer job in each of the digital copying machines, which is the characteristics of this invention, will be explained later.

Figure 2:
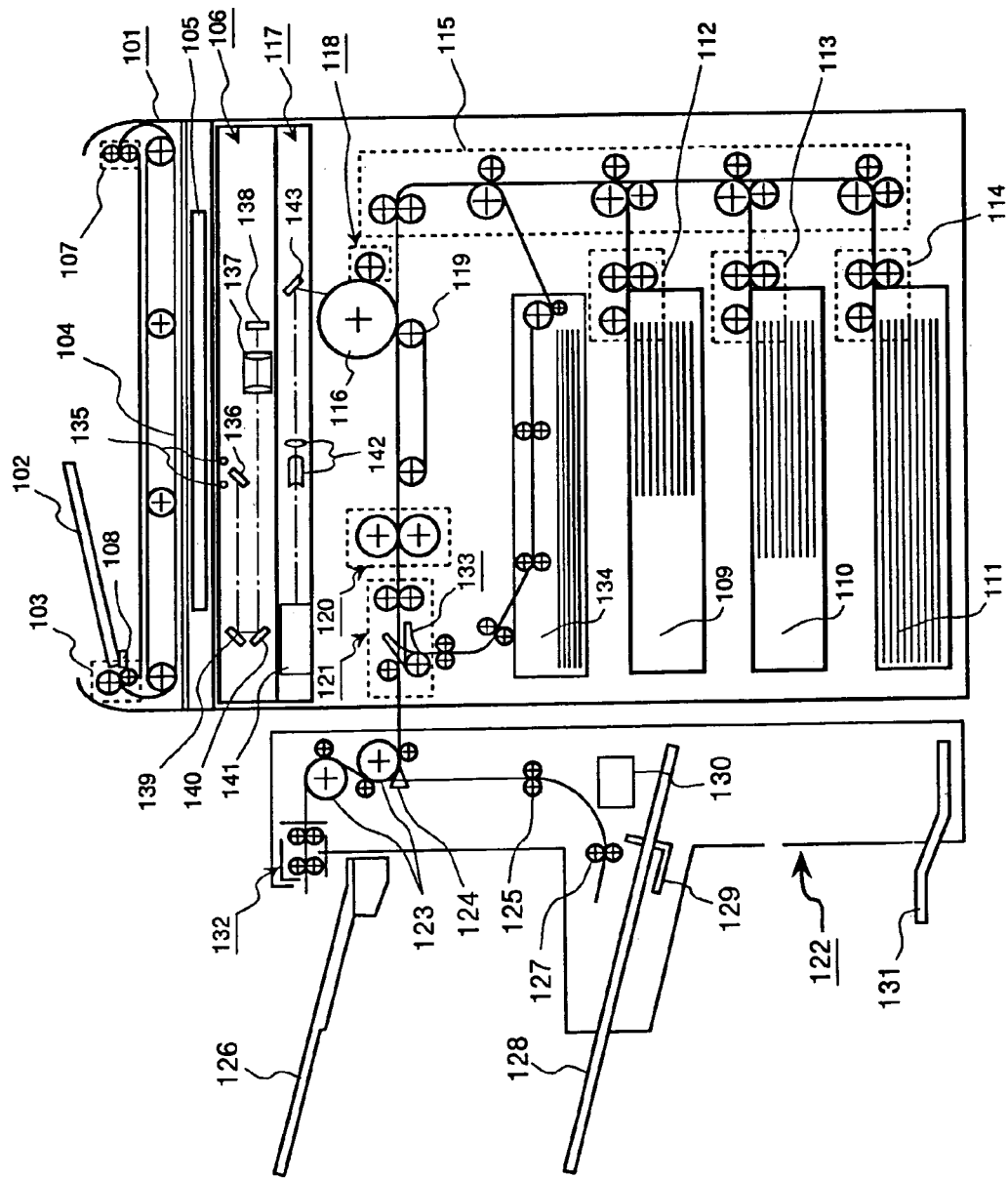
FIG. 2 shows a configuration of the digital copying machine according to this invention.

FIG. 2 shows the configuration of the digital copying machines PPC-1, PPC-2, and PPC-3 in the image formation system of FIG. 1. The digital copying machines PPC-1, PPC-2, and PPC-3 have the same configuration as explained above.

In FIG. 2, when a print key 205 on a control section 201 explained later is pressed, a batch of documents (not shown) placed with its image face up on a document handler 102 of an ADF (automatic document feeder) 101 is fed from the bottom one of the documents to a predetermined document scanned position on a contact glass 105 by feed rollers 103 and a feed belt 104.

The image of the document fed onto the contact glass 105 is scanned by a scanning unit 106, and then ejected by the feed belt 104 and output rollers 107. Further, when a document set detecting sensor 108 detects that the next document is set on the document handler 102, the operation in the same manner as that on the previous document is repeated on the next document. The feed rollers 103, the feed belt 104, and the output rollers 107 are driven by a transfer motor which is not shown.

Transfer paper loaded on a first tray 109, a second tray 110, and a third tray 111 is fed by a first paper feed section 112, a second paper feed section 113, and a third paper feed section 114, respectively, and is transferred to the position contacting a photoconductive body 116 by a vertical transfer unit 115. The document image scanned by the scanning unit 106 is written on the photoconductive body 116 with laser (not shown) from the writing unit 117, and is visualized as a toner image by a development unit 118.

The toner image on the photoconductive body 116 is transferred on the transfer paper while the paper is transferred at the speed equivalent to that of rotation of the photoconductive body 116 by a transfer belt 119. The toner image transferred on the transfer paper is fixed as an image by a fixture unit 120. The transfer paper with the image fixed (hereafter referred to as formed image) is ejected to a finisher 122, that is a post-processing unit, by a paper output unit 121.

The finisher 122 as a post-processing unit can lead the transfer paper transferred by the paper output unit 121 in the main body of the machine to the direction of a paper output tray 126 and the direction of a staple processing section (in the lower left-hand side of the figure). The way to lead the paper at this time is performed by using a switching plate 124. By switching the switching plate 124 to the upward direction, the transfer paper can be ejected to the paper output tray 126, which is an ordinary operation, through paper output rollers 123 and a transfer roller unit 132. By switching the switching plate 124 to the downward direction, the paper can be transferred to a staple handler 128 through transfer rollers 125 and 127.

The edges of transfer paper stacked on the staple handler 128 are squared up by a jogger 129 for jogging paper each time a sheet of paper is ejected, and a batch of sheets is stapled by a stapler 130 when it is completed to be copied. A group of transfer paper sheets stapled by the stapler 130 is accommodated in a staple-completed paper output tray 131 under its own weight.

On the other hand, the ordinary paper output tray 126 is movable to and fro. The paper output tray 126, that is movable to and fro, moves frontward or backward for each document or each copied paper sheet sorted by an image memory 501 explained later, and sorts the copied paper sheets simply ejected.

When an image is to be formed on both sides of the transfer paper, the transfer paper, that is fed from any of the first tray 109, the second tray 110, and the third tray 111 and on which an image is formed, is not lead to the paper output tray 126, but is temporarily stocked in a paper feed unit 134 for two-sided copy by setting a branching claw 133 to switch a path to the upward direction.

The transfer paper stocked in the paper feed unit 134 for two-sided copy is then fed out again from the paper feed unit 134 for two-sided copy, and the toner image formed on the photo conductive body 116 is transferred on to the transfer paper, and the transfer paper with the image is then lead to the paper output tray 126 by setting the branching claw 133 to switch a path to the downward direction. As explained above, the two-sided copy paper feed unit 134 is used for the case where an image is also formed on the other side of the transfer paper.

The photoconductive body 116, the transfer belt 119, the fixture unit 120, the paper output unit 121, and the development unit 118 are driven by a main motor (not shown). The first paper feed section 112, the second paper feed section 113, and the third paper feed section 114 are driven by the driving force of the main motor transferred through a first paper feed clutch (not shown), a second paper feed clutch (not shown), and a third paper feed clutch (not shown), respectively. The vertical transfer unit 115 is driven by the driving force of the main motor transferred through an intermediate clutch (not shown).

The digital copying machine has a link copy function that a document is set in one of digital copying machines and at least two units of the digital copying machines share the job of executing copy operation on the document, and a printer function of printing according to a print request from the outside.

The scanning operation of an image in the scanning unit 106, and the writing operation of the image in the writing unit 117, that is, the operation until a latent image of the image is formed on a recording surface are explained below. The latent image mentioned here is potential distribution generated by converting the image to optical information and irradiating the optical information on the surface of the photoconductive body.

The scanning unit 106 comprises the contact glass 105 where a document is placed and an optical scanning system. The optical scanning system comprises exposure lamps 135, a first mirror 136, a lens 137, a CCD image sensor 138, a second mirror 139, and a third mirror 140. The exposure lamps 135 and the first mirror 136 are fixed on a first carriage (not shown), and the second mirror 139 and the third mirror 140 are fixed on a second carriage (not shown). An image is mechanically scanned at a relative speed of 2 to 1 between the first carriage and the second carriage so that the length of an optical path does not vary when the image is scanned from a document. This optical scanning system is driven by a scanner drive motor (not shown).

The document image is scanned by the CCD image sensor 138 to be converted to electric signals, and the signals are processed. A scaling factor of an image is changed by moving the lens 137 and the CCD image sensor 138 in the lateral direction (in FIG. 1). That is, the locations of the lens 137 and the CCD image sensor 138 are set in their lateral direction corresponding to the specified scaling factor.

The writing unit 117 comprises a laser output unit 141, an imaging lens 142, and a mirror 143. A laser diode (not shown) as a laser light source and a rotating polygon mirror (hereafter referred to as polygon mirror, not shown) that rotates at a high and constant speed by a motor (not shown) are internally provided in the laser output unit 141.

The laser beam irradiated by the laser output unit 141 is polarized by the polygon mirror rotating at a constant speed, passes through the imaging lens 142 to be reflected by the mirror 143, and is focused to form an image on the surface of the photoconductive body 116.

The polarized laser beam is exposed and scanned in the direction (lateral scanning direction) orthogonal to the direction to which the photoconductive body 116 rotates, and image signals output from a selector 502 (See FIG. 6) of an image processing unit explained later are recorded line by line. An image (electrostatic latent image) is formed on the surface of the photoconductive body 116 by repeating lateral scanning at a predetermined cycle corresponding to the rotating speed of the photoconductive body 116 and the recording density.

As explained above, the laser beam output from the writing unit 117 is irradiated to the photoconductive body 116. A beam sensor (not shown) that generates a lateral scanning synchronization signal is disposed at a position, to which a laser beam is irradiated, near one edge of the photoconductive body 116. The writing unit 117 provides controls for a timing of starting to record an image in the lateral scanning direction based on this lateral scanning synchronization signal and generates a control signal to perform input or output of an image signal, which will be explained later.

The control system of the digital copying machine is explained in detail below with reference to FIG. 3 and FIG. 4.

Figure 3:
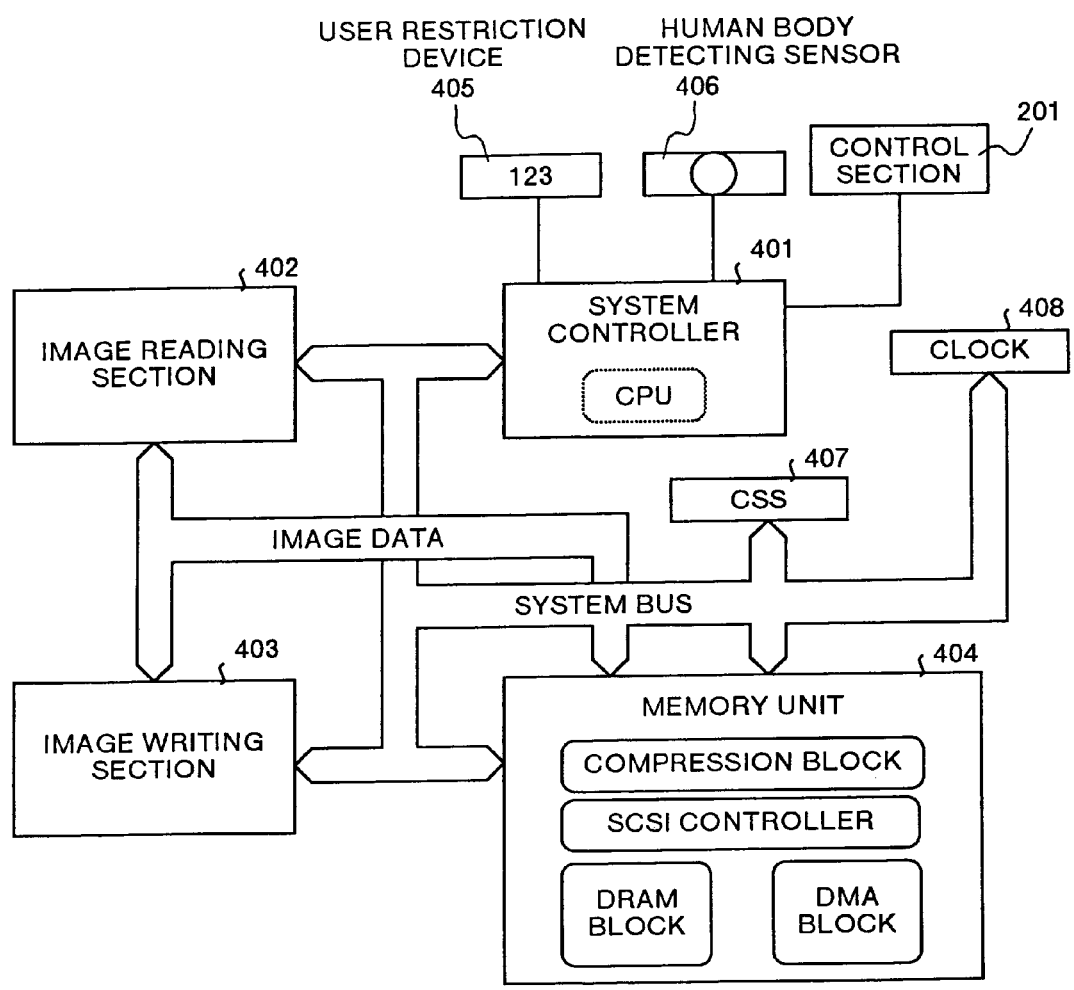
FIG. 3 shows a control system (First example of the configuration) of the digital copying machine shown in FIG. 1.

FIG. 3 shows the control system of the digital copying machine, in which sections are arranged around a system controller 401 that controls the overall digital copying machine. This system controller 401 controls operations of the sections in the digital copying machine, and controls execution of the link copy mode in which a scanned image is transferred to another connected digital copying machine, and then the machine itself and the relevant digital copying machine share the job of printing the scanned image. An image reading section 402, an image writing section 403, a memory unit 404, a CSS 407, and a clock 408 are connected to the system controller 401 through a system bus. Further, a user restriction device 405, a human body detecting sensor 406, and the control section 201 are directly connected to the system controller 401. The image reading section 402, the image writing section 403, and the memory unit 404 are connected to one another through an image data bus.

The memory unit 404 comprises a compression block, a DRAM block, a DMA block, and a SCSI controller. The DRAM block in the memory unit 404 stores image signals read-in from the image reading section 402, and can transfer the image data stored in the image writing section 403 based on the request from the system controller 401. The compression block has a compression function in a method such as such as MH, MR, and MMR methods, and can compress the image read-in once, so that efficiency of utilizing memory (DRAM) can be improved. Further, an image can be rotated by changing an address to be read out from the image writing section 403 and the orientation of the image. This memory unit 404 is not needed under the situation where only an ordinary copying function is performed.

The clock 408 is required only when a weekly timer function of booting or shutting down the machine on a specified time is performed. The human body detecting sensor 406 is necessary only in a case where a function of automatically releasing preheating mode is performed when a user approaches the machine in the preheating mode. The CSS 407 has a function of carrying out remote diagnosis, that is, automatically alerting a service center of any error in the machine, or monitoring the operational status/usage status of the machine from a remote location. These devices may be mounted only when the functions are required.

Figure 4:
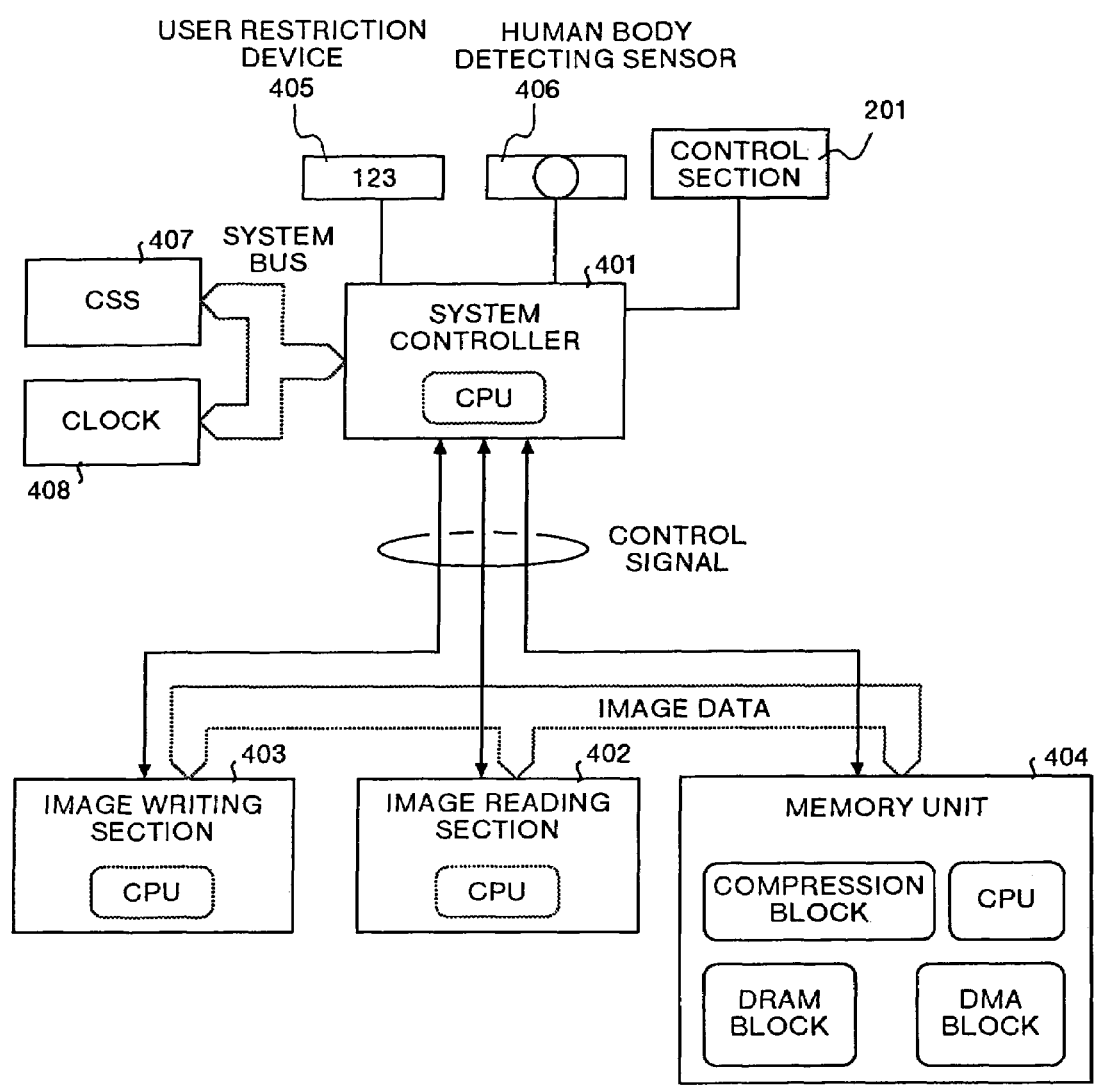
FIG. 4 shows a control system (Second example of the configuration) of the digital copying machine shown in FIG. 1.

FIG. 4 shows another example of the configuration of the control system in the digital copying machine. In the first example of the configuration (FIG. 3), there is employed a centralized control system in which the CPU of the system controller 401 provides controls for the image reading section 402, the image writing section 403, the memory unit 404, and the CSS 407, but the present invention is not limited by this system. For example, a decentralized control system may be employed. In this decentralized control system, the image reading section 402, the image writing section 403, and the memory unit 404 include respective CPUs, and a command from the system controller 401 to each of the CPUs is transferred over a control signal line as shown in FIG. 4. The configuration of the control system of the digital copying machine is not limited by the first and second examples of the configuration, but another configuration may be allowable.

Figure 5:
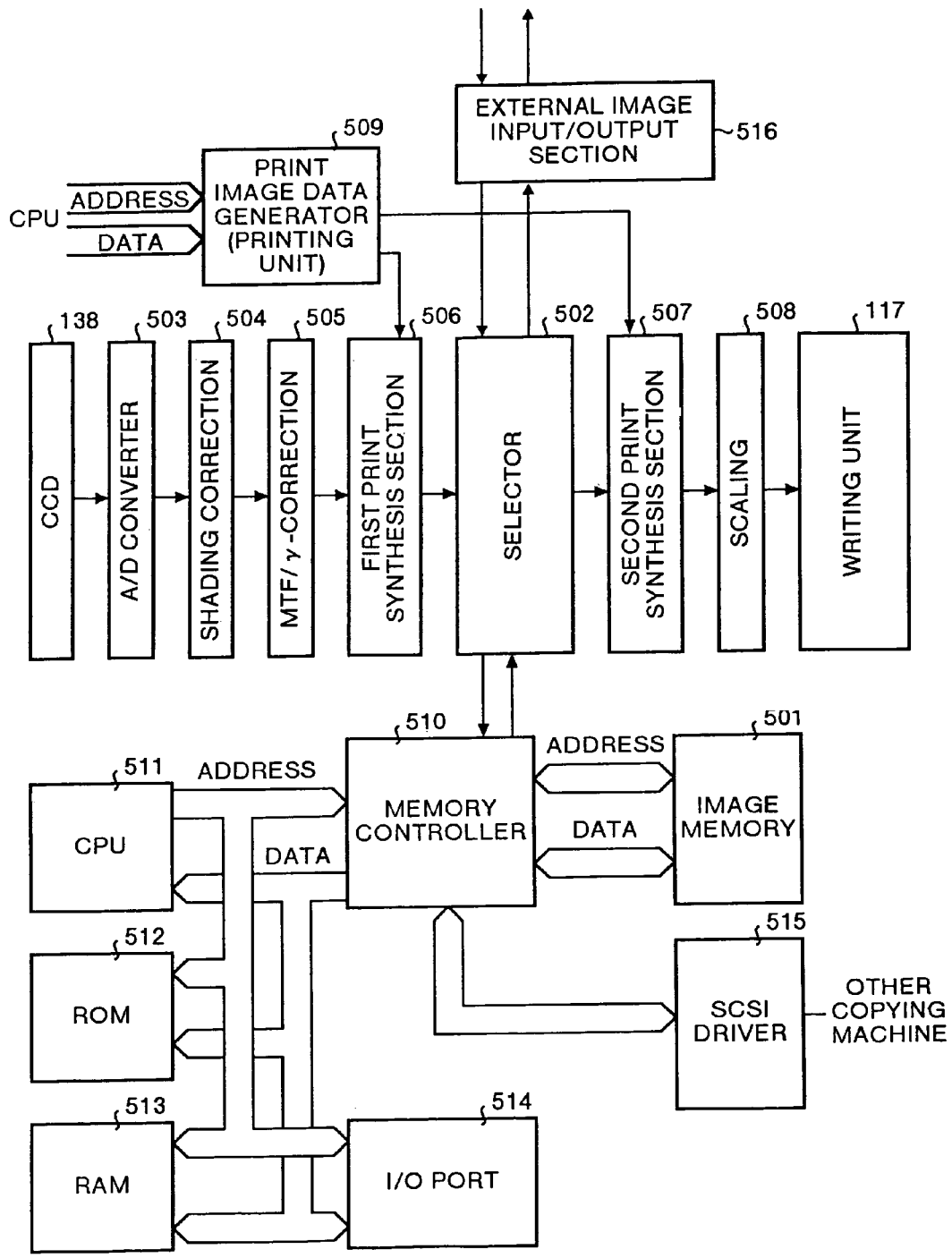
FIG. 5 is a block diagram showing an image processing unit (image reading section and image writing section).

FIG. 5 shows a configuration of the image processing unit (the image reading section 402 and the image writing section 403) according to this invention. The configuration of the image processing unit is explained below with reference to FIG. 5. At first, the irradiation light from the exposure lamp 135 is irradiated to the surface of a document, and the light is focused on the CCD image sensor of the scanning unit 106 by the imaging lens (not shown). The CCD image sensor 138 of the scanning unit 106 subjects a received image of the document to photoelectric conversion to generate image data (analog electric signals). This image data is converted to digital signals by an A/D converter 503, the signals are subjected to shading correction in a shading correction circuit 504, and then to MTF correction/γ-correction or the like in an MTF/γ-correction circuit 505.

A selector 502 feeds the image data input from the MTF/γ-correction circuit 505 via a first print synthesis section 506 to a scaling circuit 508 via a second print synthesis section 507, or to a memory controller 510 through switching. The image data having passed through the scaling circuit 508 is enlarged or reduced according to a scaling factor, and the data is transferred to the writing unit 117.

On the other hand, the memory controller 510 and the selector 502 are so configured as to enable bidirectional input/output of image data therebetween. The image processing unit (IPU) has a function of selecting input/output of a plurality pieces of data so that the image processing unit can also process image data (e.g., image data input from a data processing unit such as a personal computer) supplied from the outside via an external image input/output section 516, other than the image data input from the scanning unit 106. A SCSI driver 515 performs data communications with another digital copying machine. When sharing the job with another digital copying machine, the memory controller 510 transmits or receives commands and image data with this digital copying machine via the SCSI driver 515. The memory controller 510 and the SCSI driver 515 form a SCSI interface.

The image processing unit comprises a CPU 511 that sets various information (instructions) in the memory controller 510 or the like and provides controls for the scanning unit 106 and the writing unit 117, ROM 512 that stores the program of the CPU 511 and data, and RAM 513. Further, the CPU 511 can write or read data in or from the image memory 501 via the memory controller 510.

Figure 6:
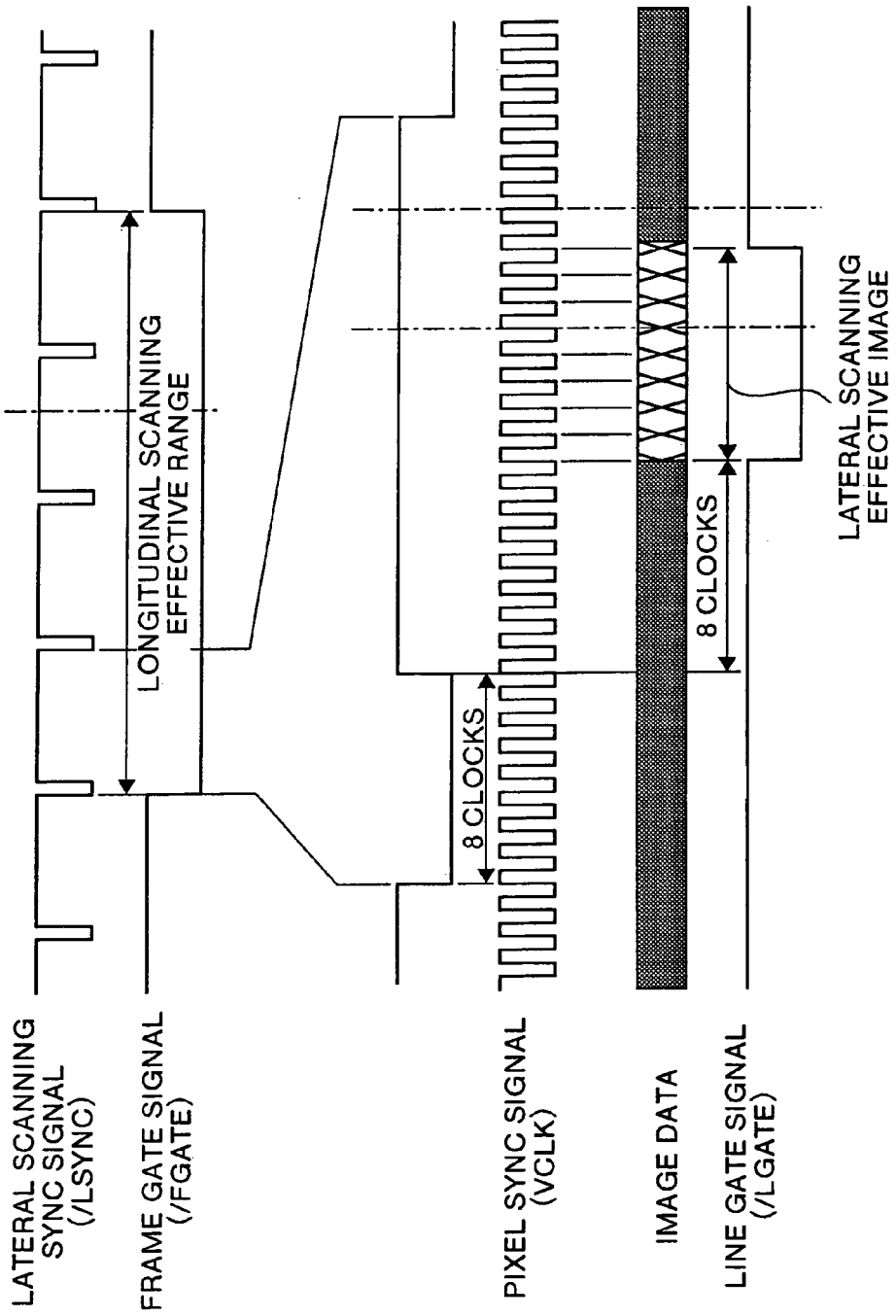
FIG. 6 is a timing chart of an image signal for one page.

Image data for one page in the selector 502 is explained below with reference to FIG. 6. FIG. 6 is a timing chart of the image data for one page. A frame gate signal (hereafter referred to as /FGATE) represents an effective period of the one-page image data in a longitudinal scanning direction. A lateral scanning synchronization signal (hereafter referred to as /LSYNC) is generated line by line, and the image data takes effective after predetermined clocks are counted since /LSYNC rises.

The signal indicating the image data in the lateral scanning direction being effective is a line gate signal (hereafter referred to as /LGATE). These signals of /FGATE, /LSYNC, and /LGATE synchronize to a pixel synchronization signal (hereafter referred to as VCLK), and one-pixel data is received at one cycle of VCLK.

The image processing unit has discrete generation mechanisms of /FGATE, /LSYNC, /LGATE, and VCLK for image input and image output. These mechanisms are configured so that various combinations of image input/output can be realized by performing phase adjustment required when a scanned document image (image data) is directly output, or the like although the detailed explanation of the mechanisms is omitted.

A printer controller (a part of the functions of the system controller 401 is referred to as a print controller) analyzes an image from the outside and a command to instruct printing, bitmaps the data so as to enable printing of the image as image data, analyzes a command for print mode, and then determines the operation. A LAN controller section and a parallel I/F section perform functions in order to receive the image and the command through a LAN and a parallel I/F to operate.

Figure 7:
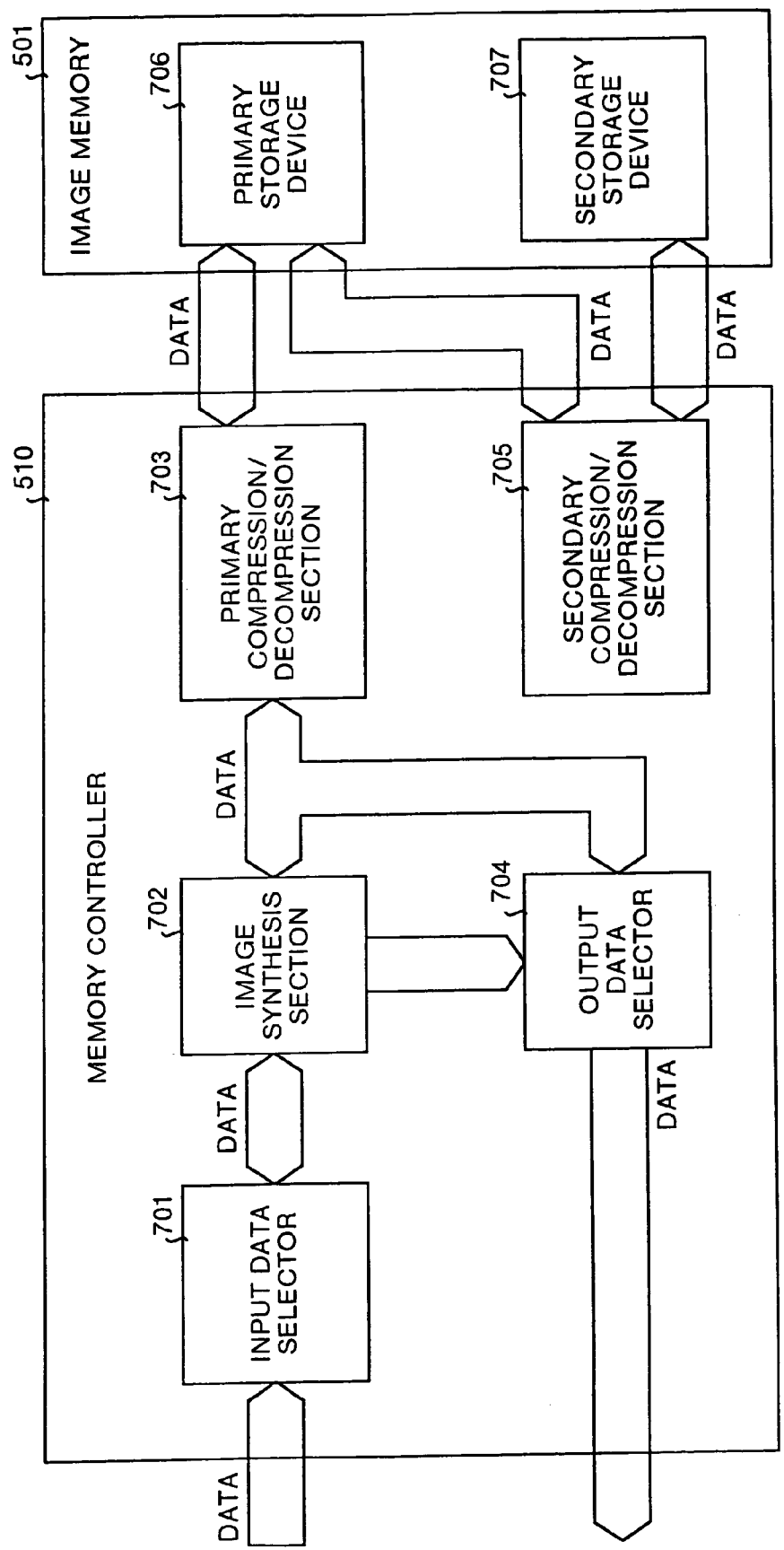
FIG. 7 is an explanatory view of the detailed configuration of the memory controller and the image memory.

The memory controller 510 and the image memory 501 are explained in detail below with reference to FIG. 5 and FIG. 7. FIG. 7 shows a detailed configuration of the memory controller 510 and the image memory 501. The memory controller 510 comprises an input data selector 701, an image synthesis section 702, a primary compression/decompression section 703, an output data selector 704, and a secondary compression/decompression section 705. Settings of control data in the sections are performed by the CPU 511. The address and the data shown in FIG. 5 represent the address and the data for image data, so that the data and the address for the control data connected to the CPU 511 are omitted.

The image memory 501 comprises a primary storage device 706 and a secondary storage device 707. Any device, that can access at a high speed such as DRAM, is used for the primary storage device 706, so that writing data in the image memory 501 in substantial synchronization with a transfer speed of input image data or reading data from the image memory 501 at the time of image output can be performed at a high speed. Further, the primary storage device 706 employs a configuration (an interface section with the memory controller 510, not shown) in which the storage device is divided into a plurality of areas according to the amount of the image data to be processed so that input and output of the image data can simultaneously be executed.

In order to enable simultaneous execution of input and output of image data in and from the divided areas, respectively, two pairs of address/data line for read and write are connected to the interface with the memory controller 510. Accordingly, the operation of outputting (reading) an image from an area 2 during inputting (writing) of an image in an area 1 becomes possible.

The secondary storage device 707 is memory with large capacity where data for synthesis or sorting of input image is stored. If a high-speed accessible element is used for both the primary storage device 706 and the secondary storage device 707, data can be processed in both of the primary storage device 706 and the secondary storage device 707, and also the controls for these devices by the memory controller 510 can comparatively be simpler. However, the element such as DRAM is expensive, therefore, the processing of input/output data is executed based on the primary storage device 706 whose access speed is high. It is needless to say that the high-speed element such as DRAM may be used for the secondary storage device 707 in the same manner as the primary storage device 706.

As explained above, by forming the image memory 501 with the primary storage device 706 and the secondary storage device 707, it is possible to realize a digital copying machine that can perform processing such as input/output, storage, and process of a large amount of image data with low cost and comparatively simpler configuration.

The operation of the memory controller 510 is schematically explained below. First of all, image input (storage of data in the image memory 501) is explained.

The input data selector 701 selects image data to be written in image memory (the primary storage device 706) out of a plurality pieces of data. The image data selected by the input data selector 701 is provided to the image synthesis section 702, in which the image data and the data already stored in the image memory 501 are synthesized. The image data processed by the image synthesis section 702 is subjected to data compression by the primary compression/decompression section 703, and the compressed data is then written in the primary storage device 706. The data written in the primary storage device 706 is further compressed in the secondary compression/decompression section 705 as required, and the compressed data is stored in the secondary storage device 707.

Image output (reading of image data from the image memory 501) is explained below. At first, when an image is to be output, the image data stored in the primary storage device 706 is read out. When the image as an object to be output is stored in the primary storage device 706, the primary compression/decompression section 703 also decompresses the image data of the primary storage device 706, and the output data selector 704 selects the decompressed data or the data obtained through image synthesis of the decompressed data and the input data, and outputs the selected data.

The image synthesis section 702 performs the processing for synthesis of the data in the primary storage device 706 and the input data (which has a function of phase adjustment to image data), and selection of a target output of the synthesized data (image output, write-back of data in the primary storage device 706, and further simultaneous output of data to both of the target outputs are possible).

When the image as an object to be output is not stored in the primary storage device 706, the image data as an object to be output stored in the secondary storage device 707 is decompressed in the secondary compression/decompression section 705, the decompressed data is written in the primary storage device 706, and the image synthesis section performs the operation of image output from then on.

Figure 8:
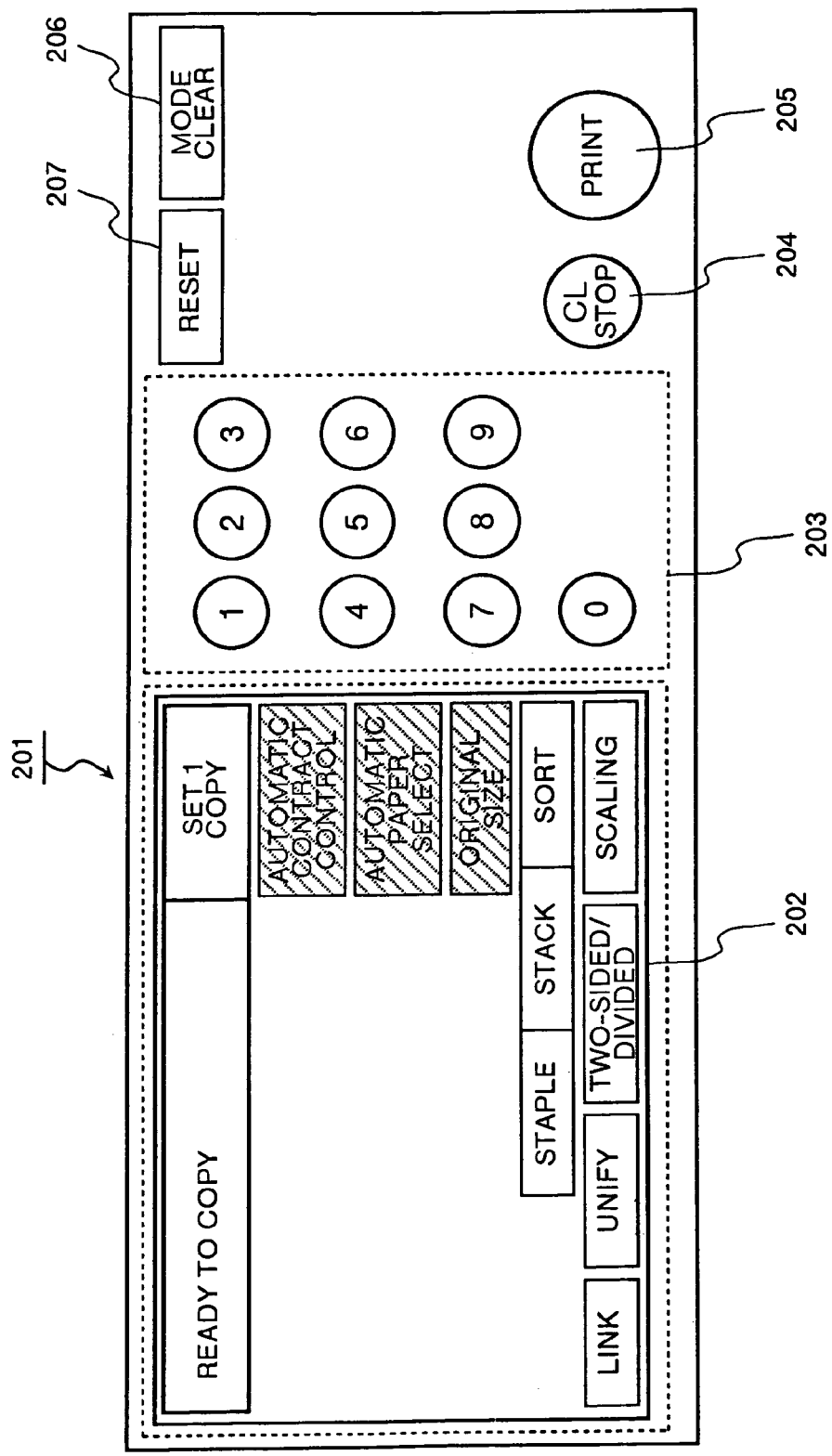
FIG. 8 is an explanatory view of the configuration of the control section.

FIG. 8 shows a configuration of the control section 201 of the digital copying machine. The control section 201 includes a liquid crystal touch panel 202, a ten-digit keypad 203, a clear/cancel key 204, a print key 205, a mode clear key 206, and a reset key 207, as shown in FIG. 8.

Function keys, copy quantity, and a message indicating the status of the digital copying machine or the like are displayed on the liquid crystal touch panel 202. Further, as shown in FIG. 8, the instant when an operator touches any of the keys displayed on the liquid crystal touch panel 202, the key indicating the selected function is inverted to black (the inverted part is shown by sloped lines in the figure). When the detail of a function is to be specified (e.g., a value to be scaled if the function is scaling), by touching a relevant function key, the setting screen for the detailed function appears. As explained above, the liquid crystal touch panel 202 uses a dot display, which allows the most adequate display for each case to be performed in a graphical form.

Figure 9:
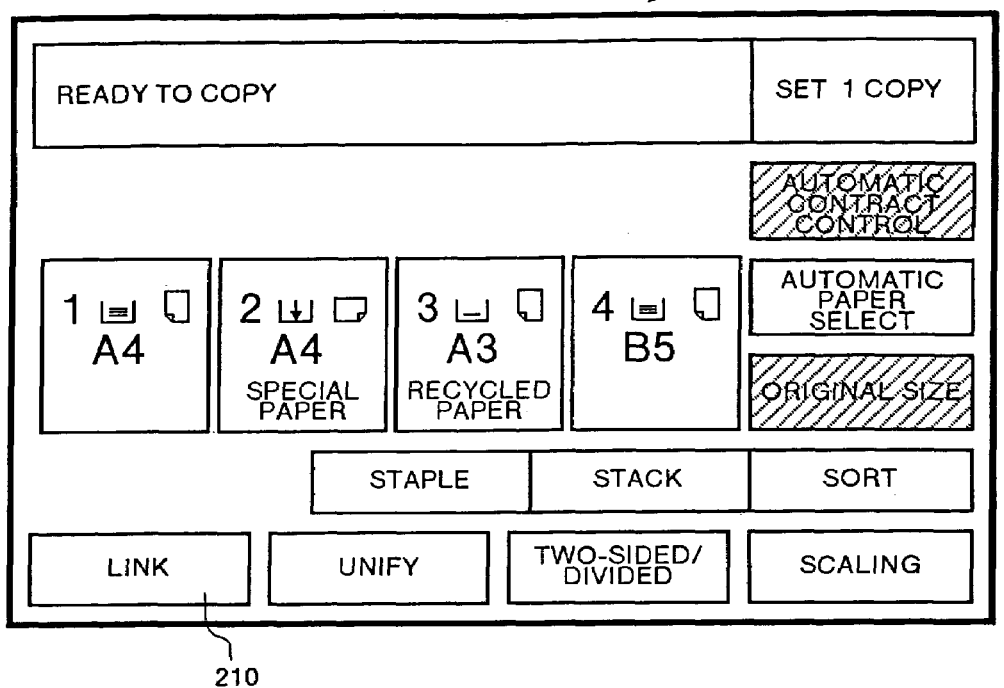
FIG. 9 is an explanatory view of an example of the screen on the liquid crystal touch panel of the control section.

FIG. 9 shows an example of display on the liquid crystal touch panel 202. The liquid crystal touch panel 202 has a message area that displays a message such as "Ready to copy" and "Wait", and a copy-quantity display section that displays a set number of copies. The liquid crystal touch panel 202 further has an automatic contrast control key used to automatically control image contrast, an automatic paper select key used to automatically select transfer paper, an original size key used to set a scaling factor to an original size, a sort key used to arrange copied paper sheets copy by copy in ascending order of pages, a stack key used to specify the processing for sorting copied paper sheets page by page, a staple key used to specify the processing for stapling sorted copied paper sheets copy by copy, a scaling key used to set a scaling factor of enlarge/reduce, a two-sided copy key used to set a two-sided copy mode, a delete/shift key, and the link copy key 210 used when a plurality of digital copying machines share the job of printing out a set document. By pressing this link copy key 210, the link copy mode is set.

In FIG. 9, respective states of paper feed trays corresponding to the number of paper feed trays are displayed, and keys used to manually set any of paper feed stages are also displayed by the number of paper feed stages. Information for size (also including information for portrait or landscape orientation), an amount of paper remaining in a tray, and a type of paper is displayed in each tray. In the keys indicating the paper remaining in each tray, the downward arrow represents a paper end state, a laterally described line represents a paper near-end state. The selected mode is displayed with sloped lines.

Figure 10:
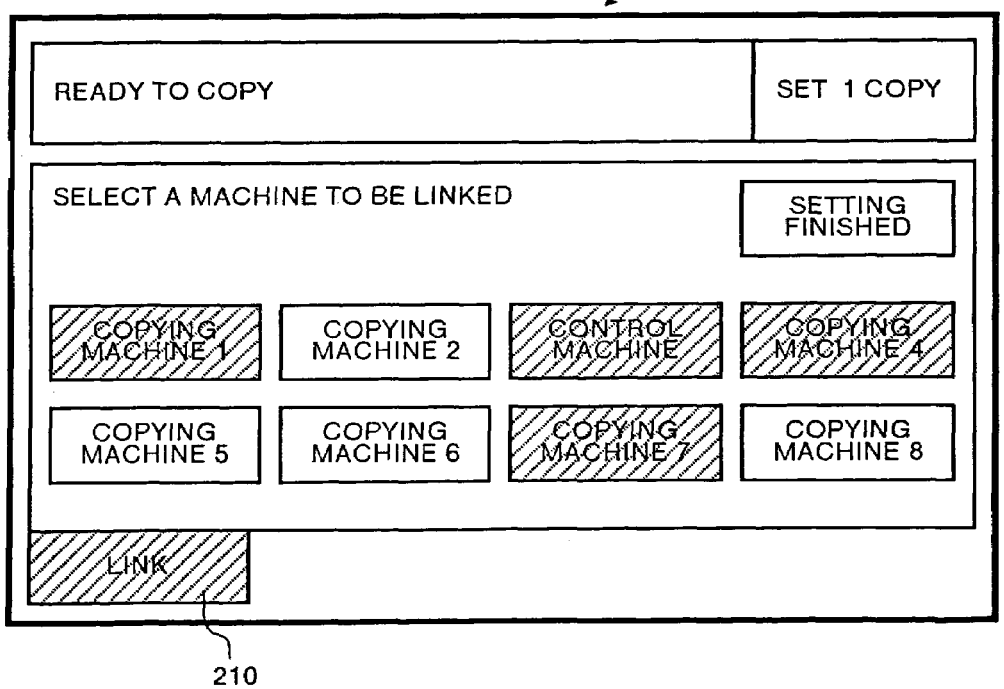
FIG. 10 is an explanatory view of an example of the screen on the liquid crystal touch panel of the control section.

Examples of display on the liquid crystal touch panel 202 when the link mode is selected are explained below with reference to FIG. 10 to FIG. 12. FIG. 10 shows a screen used to set, in the link mode, which copying machine is used to execute the link mode. By pressing any of keys for copying machines, the copying machine to be used in the link copy mode is selected. As shown in FIG. 10, the copying machine 1, the control machine, the copying machine 4, and the copying machine 7 are selected. When the setting is finished, a setting end key is pressed, so that the screen of FIG. 11 appears.

Figure 11:
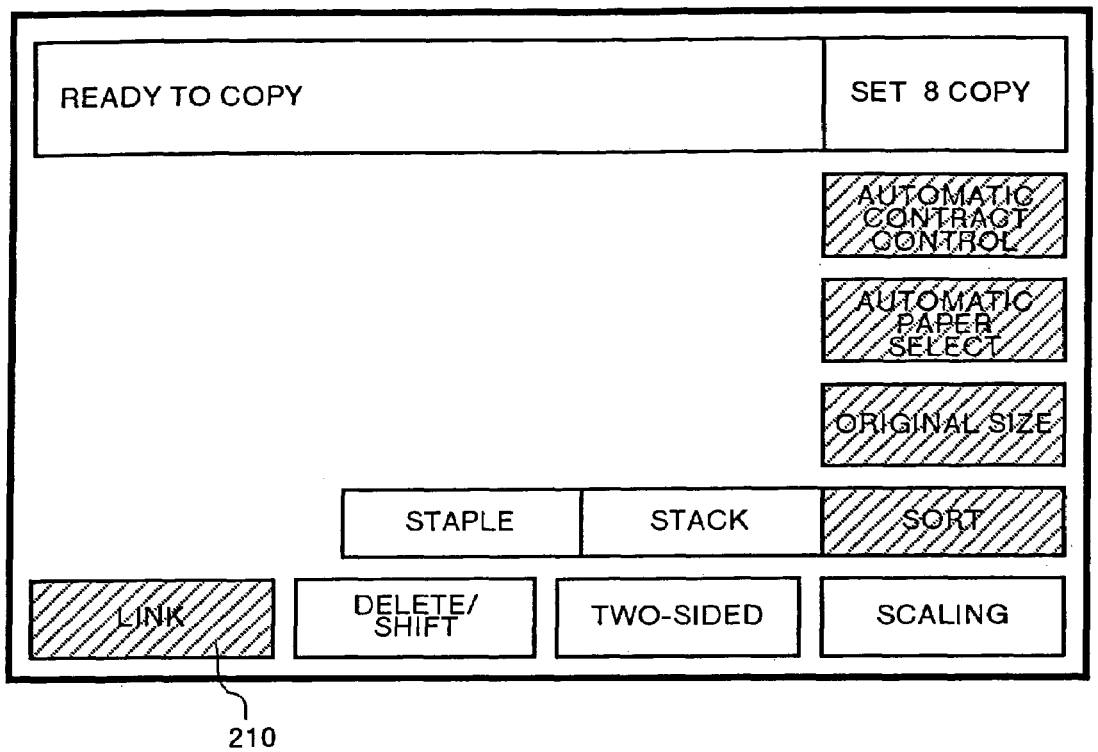
FIG. 11 is an explanatory view of an example of the screen on the liquid crystal touch panel of the control section.
Figure 12:
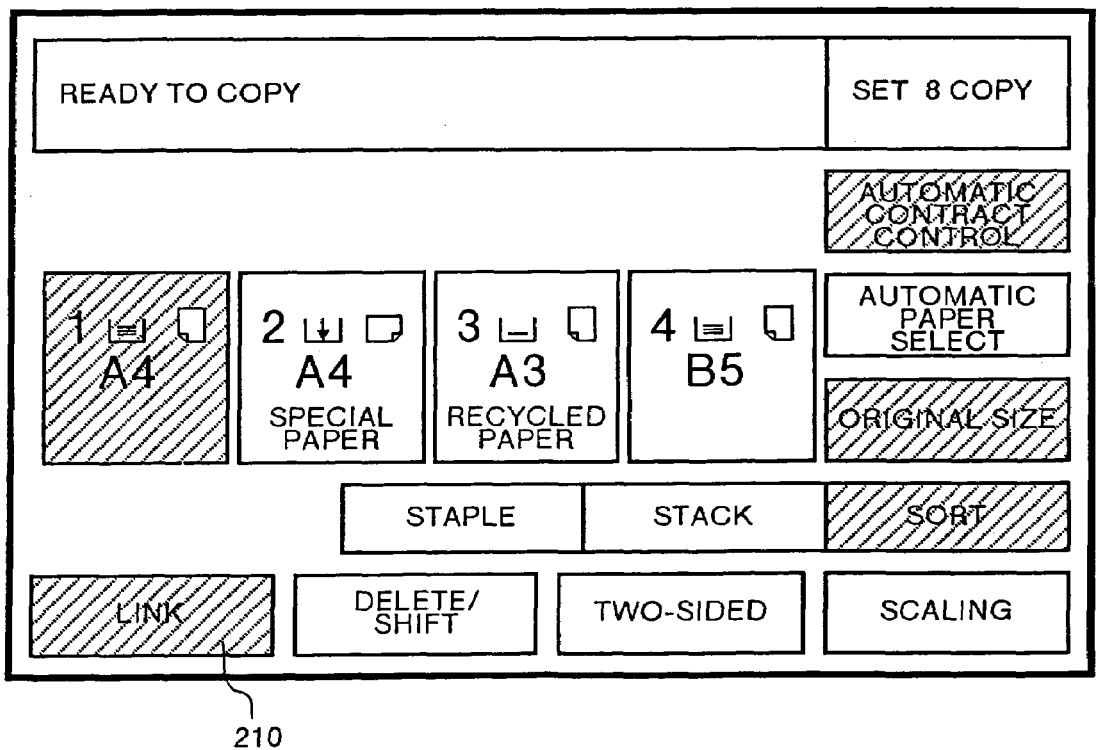
FIG. 12 is an explanatory view of an example of the screen on the liquid crystal touch panel of the control section.
Figure 13:
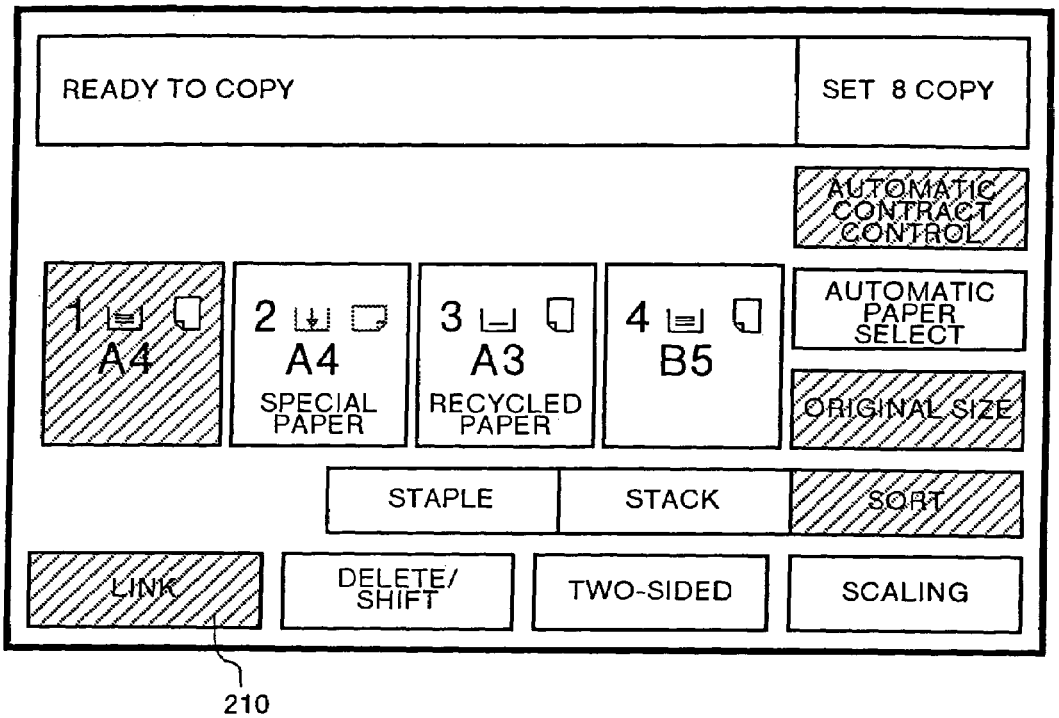
FIG. 13 is an explanatory view of an example of the screen on the liquid crystal touch panel of the control section.
Figure 14:
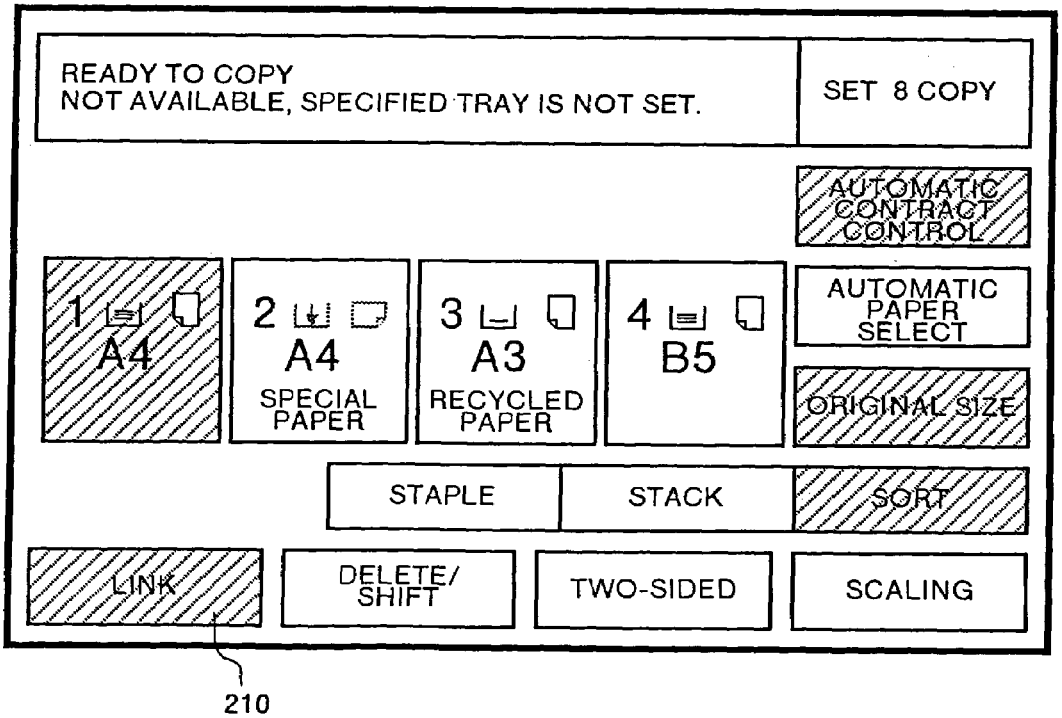
FIG. 14 is an explanatory view of an example of the screen on the liquid crystal touch panel of the control section.
Figure 15:
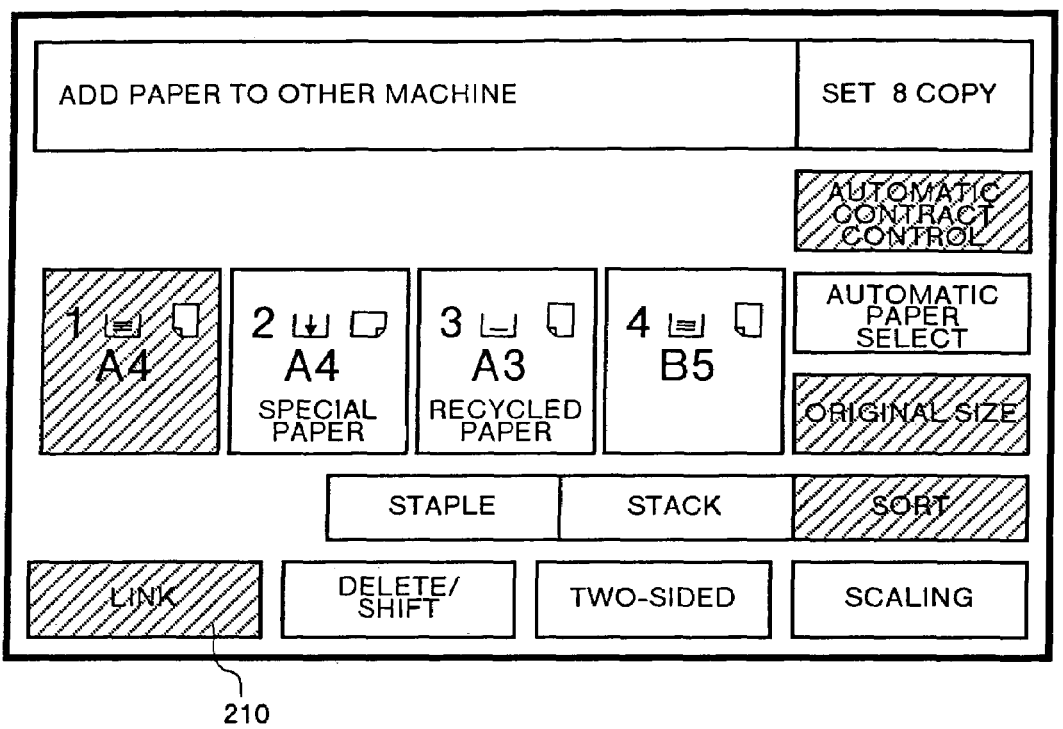
FIG. 15 is an explanatory view of an example of the screen on the liquid crystal touch panel of the control section.

In this screen of FIG. 11, the link mode is set. This link mode is released by pressing the link copy key 210, and by pressing the key again, the screen of FIG. 10 appears. FIG. 12 shows a screen in which paper for manual operation is selected. FIG. 13 shows a screen in which a non-selectable paper feed stage is displayed at lower intensity. If this key displayed at lower intensity is tried to select by pressing it, a message to the effect that the stage can not be used is displayed. FIG. 15 shows a display at the time of interrupting the operation and displaying a message for adding paper if there is any machine, other than the control machine, which needs to add paper at the time of starting the operation.

Figure 16:
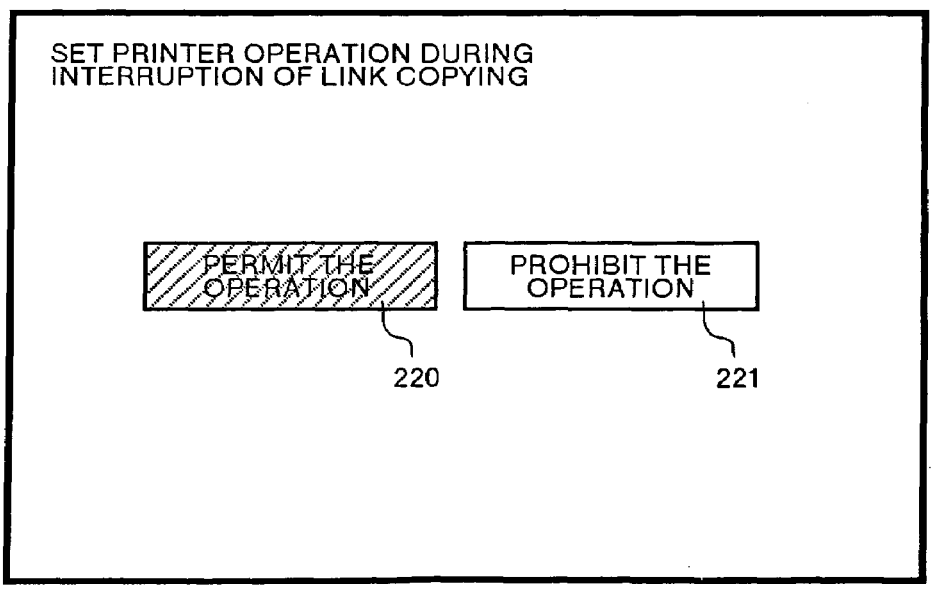
FIG. 16 is an explanatory view of an example of the screen on the liquid crystal touch panel of the control section.

FIG. 16 shows a screen used to set the printer operation during interruption of link copying. This screen shown in FIG. 16 appears when the reset key is pressed. On this screen, "Permit the operation 220" or "Prohibit the operation 221" is set by the user. The printer operation is performed according to this setting during interruption of link copying. More specifically, as explained later (See FIG. 22), when "Permit the operation 220" is selected, the printer operation is executed during interruption of link copying. When "Prohibit the operation 221" is selected, on the other hand, the printer operation is not executed during interruption of link copying, but is executed after the link copying is finished.

Figure 17:
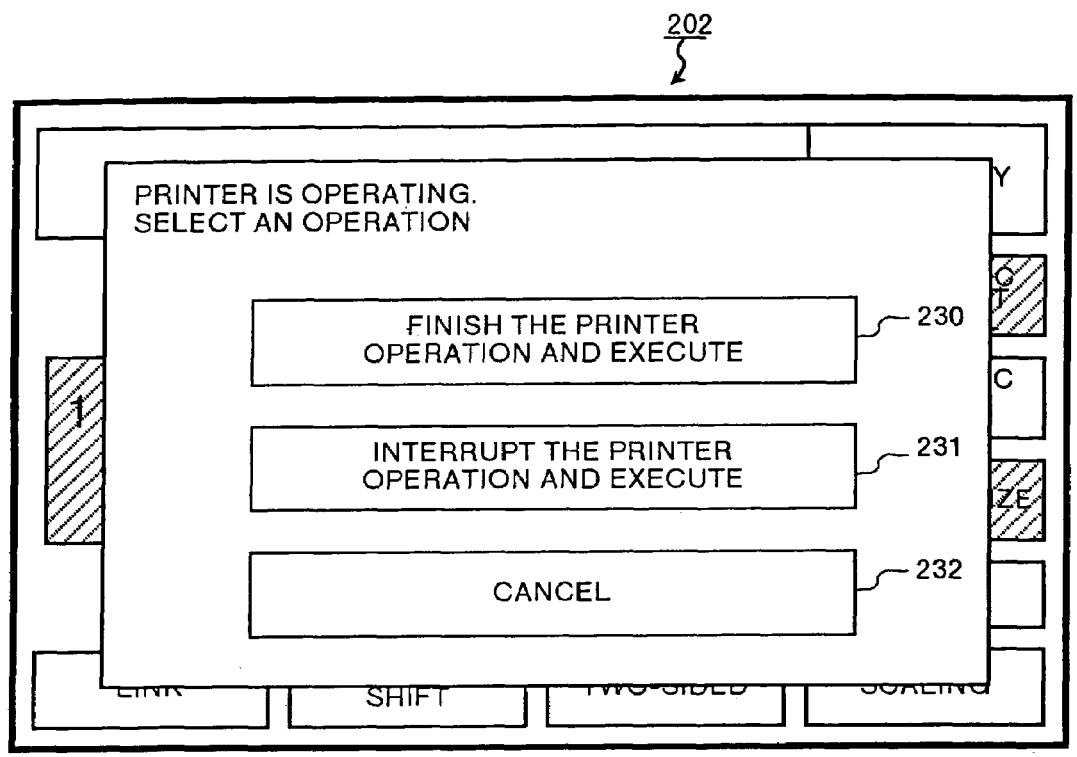
FIG. 17 is an explanatory view of an example of the screen on the liquid crystal touch panel of the control section.

FIG. 17 shows a screen displayed when the start of link copying is instructed during the printer operation. FIG. 17 shows a message of "Printer is operating. Select one of operations.", and a selection menu of "Finish the printer operation and Execute 230", "Interrupt the printer operation and Execute 231", and "Cancel 232". The user selects any of "Finish the printer operation and Execute 230", "Interrupt the printer operation and Execute 231", and "Cancel 232". The link copy operation is performed according to this selection. As specifically explained later (See FIG. 21), when "Finish the printer operation and Execute 230" is selected, the link copy operation is executed at the time when the printer operation is finished. When "Interrupt the printer operation and Execute 231" is selected, the printer operation is interrupted and the link copy operation is executed. When "Cancel 232" is selected, the link copy operation is cancelled.

Figure 18:
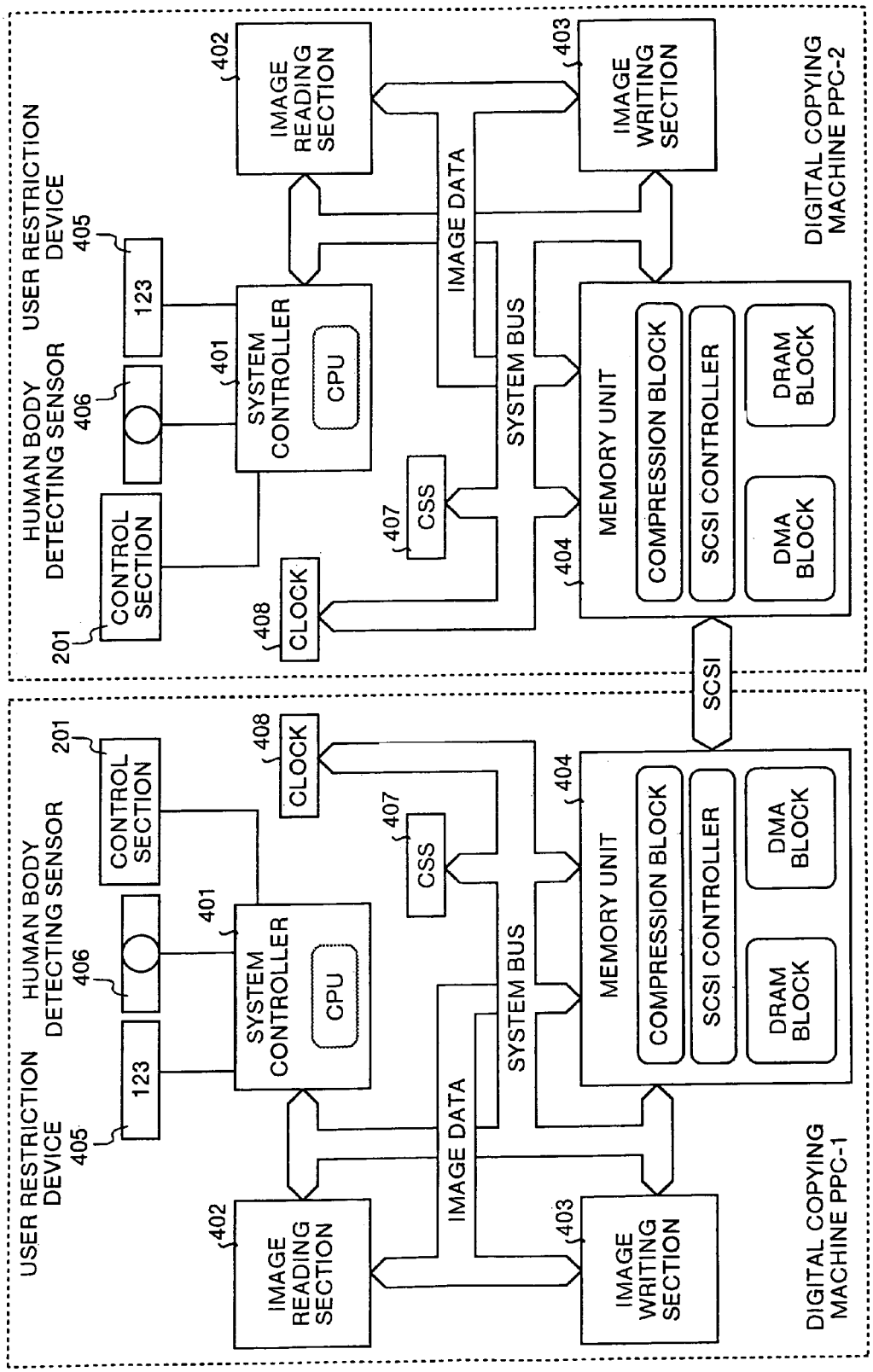
FIG. 18 shows the configuration of hardware (example of connection) of the digital copying machine.

FIG. 18 shows an example of connection between the digital copying machine PPC-1 and the digital copying machine PPC-2 in FIG. 1. The configurations of the hardware of the digital copying machines. PPC-1 and PPC-2 as shown in FIG. 18 are the same (the same as that of FIG. 3). Control data such as control commands and setting commands and image data are transferred between the digital copying machines PPC-1 and PPC-2 via respective SCSI controllers, and the received image data is temporarily stored in each DRAM block. The SCSI is used in this case, but by separately providing serial interfaces for image data and control data, the image data and the control data may discretely be transferred and received.

When the link copy mode is executed between these digital copying machines PPC-1 and PPC-2, one of the machines, of which the link copy key 210 is pressed to set the link copy mode prior to the other machines, is determined as a master machine (control machine). The master machine then issues a link request to another digital copying machine (slave machine) as a target to be linked, establishes a link between the two machines, and executes the link copy mode. In this link copy mode, the image data for a document scanned by the master machine is transferred to the slave machine, and the master machine and the slave machine share the job of printing. That is, the two machines share and execute one copy job. As explained above, both of the digital copying machines PPC-1 and PPC-2 can function as a master machine and a slave machine, and vice versa. The case, where the digital copying machine PPC-1 is set as a master machine and the digital copying machine PPC-2 is set as a slave machine, is explained below.

Conflicts between link copying (link copy job) and printing by a printer (print job) are explained below. At first, any machine, in which the link copy key 210 of the control section 201 is pressed, is set as a master machine (the digital copying machine PPC-1 in the example shown in FIG. 18), and transmits a link request to a machine as a target to be linked. The machine receiving the link request is set as a slave machine (the digital copying machine PPC-2 in the example shown in FIG. 18). From then on, all the operation is performed by the master machine, so that using the control section 201 of the slave machine is prohibited.

In the master machine, when scanning a document image is started in the image reading section 402, the image data is transferred from the image reading section 402 to the memory unit 404 via the image data bus. The memory unit 404 accumulates the image data and also transfers the image to the slave machine. Accordingly, in the master machine, the image reading section 402 and the memory unit 404 are occupied. On the other hand, in the slave machine, the image data transmitted from the master machine is accumulated in the memory unit 404. In the master machine and the slave machine, the image data is transferred from the memory unit 404 to the image writing section 403 to perform printing.

When a print request is made from the outside (e.g., personal computer), an image to be printed is transferred in a printer language, and the image is bitmapped in the memory unit 404. This bitmapped image to be printed is transferred from the memory unit 404 to the image writing section 403, where printing is executed. Accordingly, the image to be printed is in a wait state for bitmapping until the memory unit 404 becomes available. Conversely, during bitmapping of the image to be printed in the memory unit 404, there occurs a state of wait for reading of the document image or wait for printing of the document image.

Difference from switching of applications (copy, printer, FAX, or so) in the conventional machine as a discrete unit is that the master machine in the link copy mode keeps the control right over the slave machine. Therefore, when the print request is received during reading of a document in the master machine and if the reading operation is in a standby status, the slave machine has to wait, by which the operations are more largely affected as compared to switching of applications in the single unit. The present invention allows productivity of the digital copying machine to be improved as explained below when conflict between the link copy job and the printer job occurs.

Figure 19:
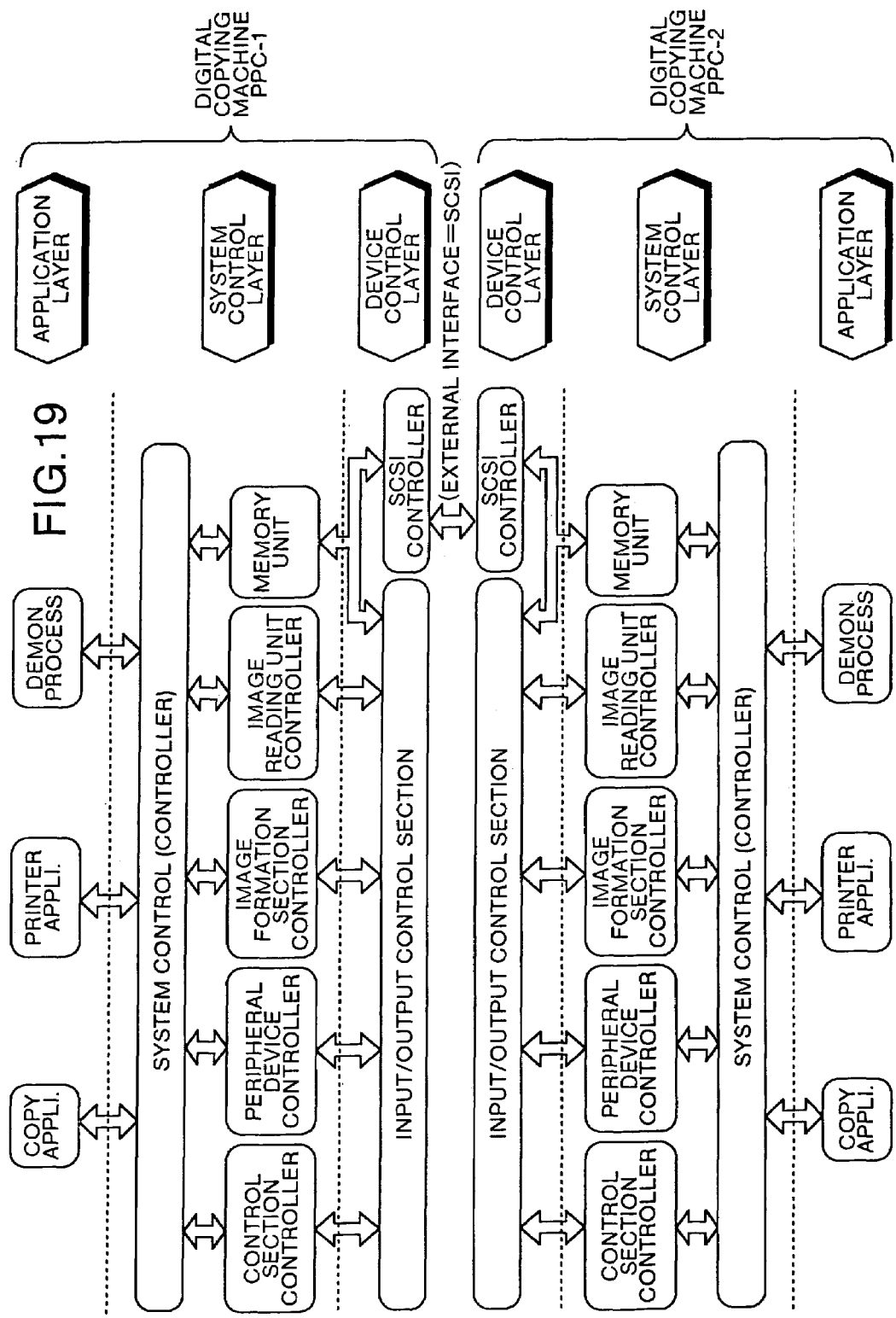
FIG. 19 is a conceptual diagram of the software of the digital copying machine.

The operation (hereafter referred to as "remote output") of transferring the image scanned by the digital copying machine PPC-1 to the image reading section 402 of the digital copying machine PPC-1I is explained below with reference to FIG. 19. FIG. 19 shows a conceptual view of software of the digital copying machine PPC-1 and the digital copying machine PPC-1I.

In FIG. 19, "Copy Appli." represents an application to perform a copy sequence for execution of duplication, "Printer Appli." represents an application to perform a sequence for execution of printing, "Input/output control" represents a layer (device driver) to perform logical/physical conversion on data. A control-panel controller represents a layer (in which LCD display, LED ON/OFF, or scanning through key entry is executed in the logical level) used to perform MMI (Man Machine Interface), and "Peripheral device controller" represents a layer used to control peripheral devices, such as a unit for automatic two-sided copy, a sorter, or an ADF, mounted on a PPC in the logical level. "Image formation section controller", "Image reading unit controller", and "Memory unit" are as explained above.

Further, "Demon process" exists as an application to read image data stored in the memory unit and transfer the image data to "Image formation section" when a print request is received from some other machine on a network. As a matter of course, image transfer from the machine on the network has to be finished before "Demon process" reads the image from the memory unit and performs printing.

The control panel, the peripheral devices, the image formation section, the image reading unit, the memory unit are handled as resources that respective PPCs obtain. When the "Digital copying machine PPC-1" in FIG. 19 is to execute duplication using its own resources (when the print start key is pressed), respective resources of the "Image formation unit", "Image reading unit", or, if necessary, "Peripheral devices" and "Memory unit" are requested to the "System control" section.

The "System control" section makes adjustment of the access right to the resource for the request from the "Copy Appli.", and notifies the "Copy Appli." of the result of adjustment (not-accessible). When "Digital copying machine PPC-1" is used on a standalone basis (the machine is not connected to the network), all the resources obtained by the system can be used only by "Copy Appli.", therefore, the duplication is instantly executed. On the other hand, like in this embodiment, when printing is performed using resources of some other machine (hereafter referred to as remote digital PPC (digital copying machine PPC-2 in the example shown in FIG. 19)) existing on the image formation system, the access right to the resources is requested to the "system controller" of the remote digital PPC (digital copying machine PPC-2).

The system controller of the remote digital PPC (digital copying machine PPC-2) makes adjustment of the resources according to the request, and notifies the application of the machine as the originator of the result on adjustment. When the access right is permitted, the application executes reading of an image, stores the image in its memory unit, and transfers the image to the memory unit of the machine as a remote target output via the interface when the processing of storage is finished. When the image transfer is finished, the application transmits conditions (such as a paper feed port, a paper output port, and print quantity) for printing to "Demon process" of the machine as a remote target output, and the transmits a command of "Start printing". When "Demon process" of the remote target output receives the command "Start printing", the "Demon process" requests to start printing to the "System controller" of its own machine (the machine that executes remote output), and the system controller executes remote output.

When the memory unit of "Digital copying machine PPC-2" is used by "Digital copying machine PPC-1", the memory unit of "Digital copying machine PPC-2" can not be accessed by the application of "Digital copying machine PPC-2" (or any digital copying machine PPC except "Digital copying machine PPC-1" when a plurality of digital copying machines PPC are connected over the network).

The terms used in this specification are explained below. [Image reading unit (Image reading section)]: As "Image reading unit" used in the digital PPC, a unit, that has a function of irradiating a light source to a document, converting the reflection light to electric signals by "Charge-Coupled Device=CCD", and performing "required image processing", is used. "Required image processing" mentioned here includes processing such as quantization (conversion of analog data converted to electric signals by CCD to binary-valued or multi-valued data), and shading correction (correction to unevenness of irradiation of a light source that irradiates a document, and variations in sensitivity of CCD)/ MTF correction (correction to a blur due to the optical system)/scaling (which represents processing of changing the density of reading an image and performing data interpolation using the read-in image data, or the like).

[Image formation section (Image writing section)]: "Image formation section" used in the digital PPC is a unit that forms an image transferred based on electric signals on a piece of ordinary paper or thermal paper by means of electronic photographing, thermal printing, thermal transfer printing, or ink-jet printing.

[Video signal], [Image data]: The electric signal of an image converted in the "Image reading unit", an electric signal of an image to be input to "Image formation section", and a signal for synchronization with the electric signal of the image are referred to as "Video signal" or "Image data" as a whole.

[Control signal], [Command]: In order to exchange "Video signal" between "Image reading unit", "Image formation section", and "Application", information needs to be transferred between the units. This means is referred to as issuing of "Control signal" or "Command".

[Extensions], [Application (referred to as Appli.)] [Memory function], [Memory unit]: A significant characteristic of a digital PPC is to convert an image to electric signals, read the electric signals, and restore the electric signals in the digital copying machine. The digital PPC becomes applicable to fields other than the conventional analog PPC by obtaining the means of changing the electric signals read-in at this time into various formats and transmitting the signals. Accordingly, functions such as a FAX, a page printer, a scanner, and a filing system can be realized. Further, in recent years, a function (hereafter referred to as memory function) of printing a plurality of sheets by one scan at the time of copying a plurality of sheets, or printing a plurality of documents onto a sheet of transfer paper has been realized. More specifically, this function is performed even during performance of a PPC function by temporarily storing the read-in image data in a storage device such as DRAM and reading the image data as required. The functions specific to the digital PPC system are referred to as "Extensions" or "Appli.". In this invention, the memory unit is used as a buffer unit when image data is transferred between machines on the network.

[System controller], [System]: Controllers for executing copy mode are generically called "System controller". The controllers include one that performs intra-machine monitoring of paper transfer processing, electronic photographing process, an abnormal state, and a state of a paper feed cassette (e.g., presence or absence of paper) in order to form an image in the image writing section, and one that controls scanning operation and ON/OFF of a light source in order to scan the image in the image reading section. Further, the latest type of digital PPC obtains not only one unit of extensions but also obtains simultaneously a plurality of applications. As explained above, digital PPCs sharing one resource are called "system", and the controller that controls this system is sometimes called "system controller".

[Resources], [Resource]: A function unit shared with a plurality of applications is called "Resources" or "Resource". The "system controller" provides controls for the system on this resource basis. The resources managed in the digital PPC of this invention includes "Image reading unit", "Image formation section", "Control section", "Memory", and "Peripheral devices (=an ADF, a sorter, a unit for automatic two-sided copy)", or the like.

[User restriction]: There are some cases where the PPC that uses especially the electronic photographing process does not desire to issue unlimited permission of access to the PPC because of the large amount of consumption required for the process. In this case, "User restriction device" such as a "coin rack", a "key counter", a "key card", or a "prepaid card", and "Lock code" are used in order to identify, restrict, and manage a "user".

[User setting]: When the system becomes complicated, discrete adaptability is required for each user. However, it is impossible to satisfy the adaptability to all these users at the time of shipment from a factory, therefore, a support in a market is essential. Accordingly, nonvolatile RAM is generally mounted in the system to allow system setting according to the request of a client. This function is referred to as "User setting".

[Idle state]: The case of a state in which the operation is not executed by a user is continued for a predetermined period is referred to as "Idle state", and any state other than the state is referred to as "Busy state". The time required for shifting from "busy state" to "idle state" can be set by the user. For example, it is needless to say about during duplication, even when the duplication is finished, the state does not shift to the "idle state" unless non-operation state by the user is continued for a predetermined period.

[Weekly timer]: A function to turn the power ON/OFF in sync with the ON/OFF times set on each day of the week. For this function, the operation to set a time module on the time and the operation to set the ON/OFF times on each day of the week are required.

[Preheating]: A mode that saves power consumption by controlling under the reduced fixing temperature by a predetermined temperature (e.g., 10° C.) and switching off a display of the control section. The setting of this mode is automatically performed after a predetermined period of time elapses since no key entry is performed in the control section or operation and manipulation are not executed, which depends on machine settings. This mode is released when a person standing in front of the machine is detected by the human body detecting sensor based on the cases of key entry in the control section or machine setting.

[Reload]: The state, where the fixing temperature reaches a temperature at which fixture is possible and copying is ready, is called reload.

[Interrupt mode]: A mode when a copy job temporarily interrupts during execution of copy operation or during manual operation to perform copy operation. By setting this mode, the previous copy mode and progress information if copying is in operation are stored in the nonvolatile RAM, the current mode shifts to the interrupt mode, and the mode is initialized. When the interrupt mode is released after the copy operation is executed, the mode and the information stored in the nonvolatile RAM are restored to return the mode to the state before the interrupt mode is set, and the mode before the interruption can be continued with Restart. The setting/releasing of this mode can be carried out by keys in the control section 201.

[Reservation of operation]: A function of automatically starting copy operation at the point in time when copying is ready after heating for fixture becomes sufficient by finishing mode setting and setting of a document and reserving the job, although the copying operation can not be started while the copying machine is being heated for fixture. In this embodiment, the time during heating for fixture is included as a target for enabling reservation of the operation, but any period of time other than the time above, on condition that a job becomes operable as the time passes, can be the target. The time required for raising the LCT tray, the time required for stabilizing the rotation of a polygon motor, and the time during addition of toner are targeted.

Figure 20:
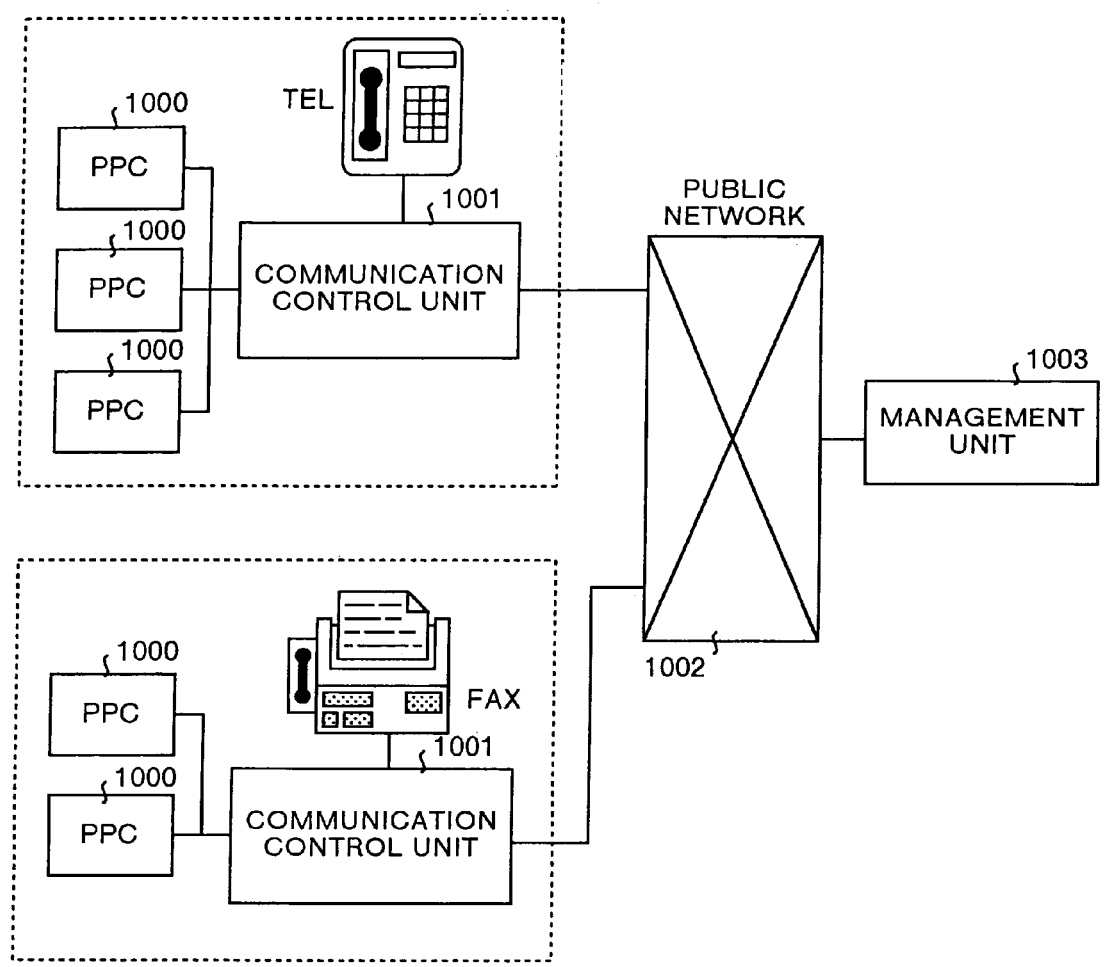
FIG. 20 shows a configuration of the digital copying machine management system.

[CSS] (or [Remote diagnosis system], [Digital copying machine management system]): FIG. 20 shows a configuration of a digital copying machine management system. A management unit 1003 installed at a service location and equipment such as PPC 1000 installed at aside of each user are connected over a public network 1002. A communication control unit 1001 to control communications with the management unit 1003 is installed at the side of user, and the user PPC 1000 is connected to this communication control unit 1001. A telephone set or a facsimile unit is connectable to the communication control unit 1001, that is, the communication control unit 1001 can be installed by being inserted into the existing line of the user. Although a plurality of PPCs are connectable to the communication control unit 1001, there is naturally a case of a single unit.

These PPCs do not require the same type, therefore, different types of PPCs may be allowable, and further, any equipment other than the PPC may be allowable. It is assumed here, for convenience in explanation, that five units of PPCs at the maximum are connectable to one unit of communication control unit. The communication control unit and the plurality of PPCs have multi-drop connection therebetween based on RS-485 standard. Communication control between the communication control unit and each of the PPCs is performed based on a basic type of data transfer control sequence. A data link is established in a polling/selecting system that provides centralized control with the communication control unit set as a control station, therefore, communications with any of the PPCs can be performed. Each PPC is allowed to set a specific value with an address setting switch. Accordingly, a polling address and a selecting address of each PPC can be determined.

A first example of operation of the digital copying machine configured as explained above when a link copy job conflicts with a printer job is explained below with reference to FIG. 21 to FIG. 22. The operations of a master machine and a slave machine when the link copy job conflicts with the printer job are basically the same as each other.

First of all, the operation of a digital copying machine when an instruction to execute link copying (link copy job) is received during execution of printer operation (print job) is explained below with reference to FIG. 21.

Figure 21:
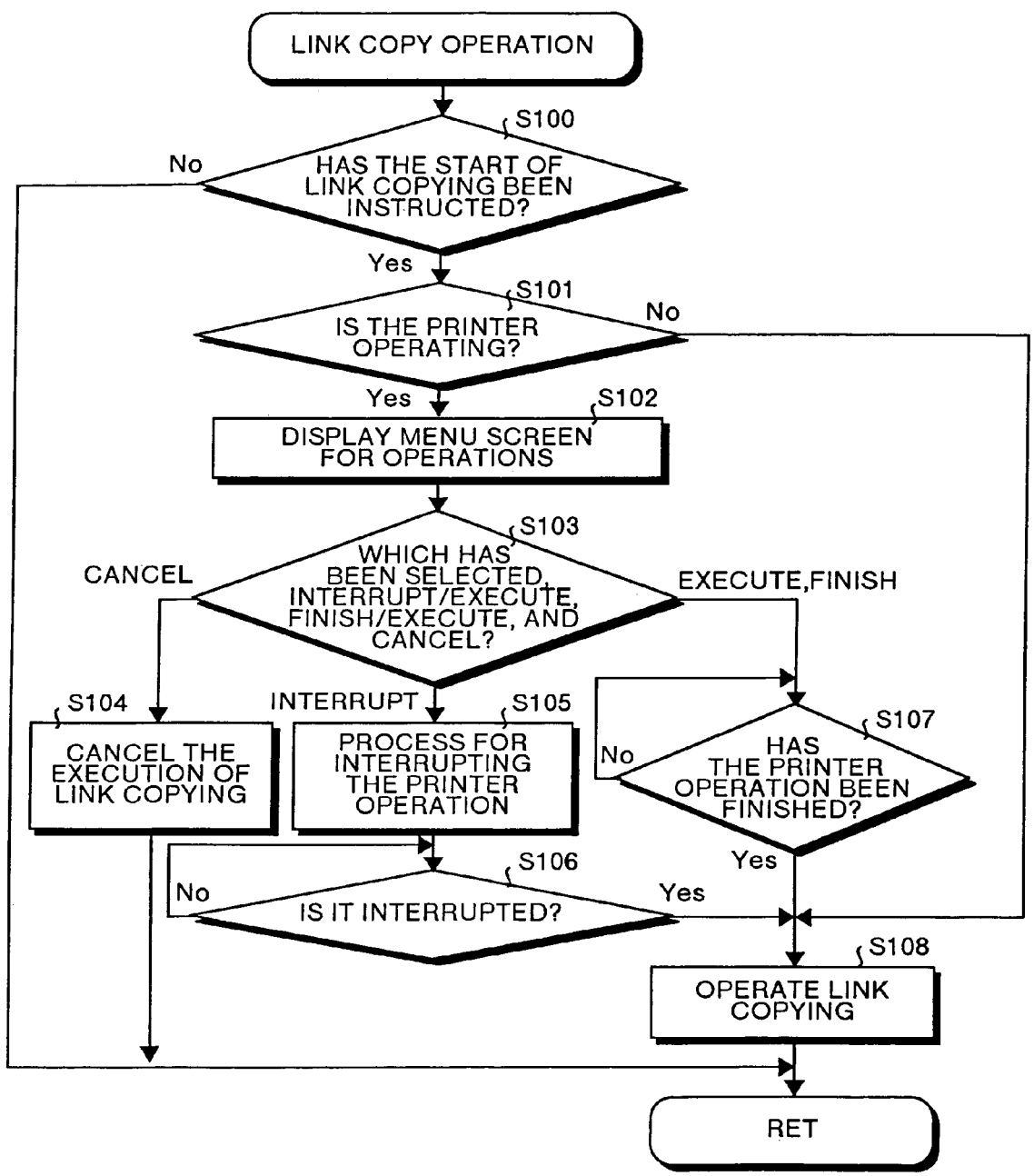
FIG. 21 is a flow chart for explanation of the example of operation (Part 1) when an instruction to start link copying is received during printer operation.

In FIG. 21, when an instruction to start printing for link copy operation is received (step S100), it is determined whether the printer is operating (step S101). As a result of this determination, when the printer is not operating, the link copy operation is started (step S108). On the other hand, when the printer is operating, a screen, that is used to select an operation so as to avoid butting of operations against each other, is displayed on the liquid crystal display panel 202 of the control section 201. FIG. 17 explained above shows the example of display of the menu screen for selection. Menu items of "Finish the printer operation and Execute 230", "Interrupt the printer operation and Execute 231", and "Cancel 232" appear in the menu screen as shown in FIG. 17, so that any operation according to the operational status of the machine can be selected.

It is determined which operation has been selected by the user (step S103). When "Cancel" 232 has been selected, the link copy operation is cancelled (step S104). At step S103, when "Interrupt the printer operation and Execute 231" has been selected, the processing for interrupting the printer operation is executed (step S105), and the request to interrupt the printing is issued to the side of printer processing. The interruption of the printer operation is checked (step S106), and the link copy operation is executed at the point in time when the interruption is checked (step S108). At step S103, when "Finish the printer operation and Execute 230" has been selected, the finish of the printer operation is monitored (step S107), and the link copy operation is executed at the point in time when the printer operation is finished (step S108). When the link copying has been finished, the request is released in case where the request to interrupt the printer operation may have been issued.

When the printer operation has been finished, the operation shifts to the link copy operation even during displaying of the menu screen although this status is not shown in the figure. By the way, images printed in the link copy mode and images printed in the printer-operation mode are output to different paper output trays, so that both of the printed images will not be mixed up.

As explained above, according to the example of the operation, when the instruction to start link copying is received during printer operation, the printer operation is interrupted according to the instruction by the user, and the link copy operation is started. Therefore, based on such assumption that the case where copying is executed in a plurality of machines indicates a particular case where the copying is urgently required, restriction is provided to another operation after the copy operation is started to prioritize productivity of the copy operation, which makes it possible to meet the user's needs.

According to the example of the operation, when the instruction to start link copying is received during printer operation, a relevant machine waits for finishing the printer operation according to the instruction by the user, and the link copy operation is started after the printer operation is finished. Therefore, when the link copy operation and the other print operation have the same level of priorities, the link copy operation is started after the previous operation is finished. By allowing the operations to be equally performed, it is possible to meet the user's operational needs. It is also possible to improve operability by automatically starting the operation.

According to the example of the operation, at the time of starting the link copy operation, the message indicating that the machine is in operation is displayed, and the user can select any of "Interrupt/Execute", "Finish/Execute", and "Cancel the operation". Thus, it is possible to meet a variety of user's needs.

According to the example of the operation, when the printing based on the print request from the outside is finished during displaying of the menu screen, the menu screen is dismissed, and the link copy operation is started. Therefore, by supporting variations in the operational status of the machine with adequate screen display, it is possible to improve operability and total productivity of the machine.

An example of the operation of the digital copying machine when an instruction to execute printer operation (printer job) is received during execution of link copying (link copy job) is explained below with reference to FIG. 22.

Figure 22:
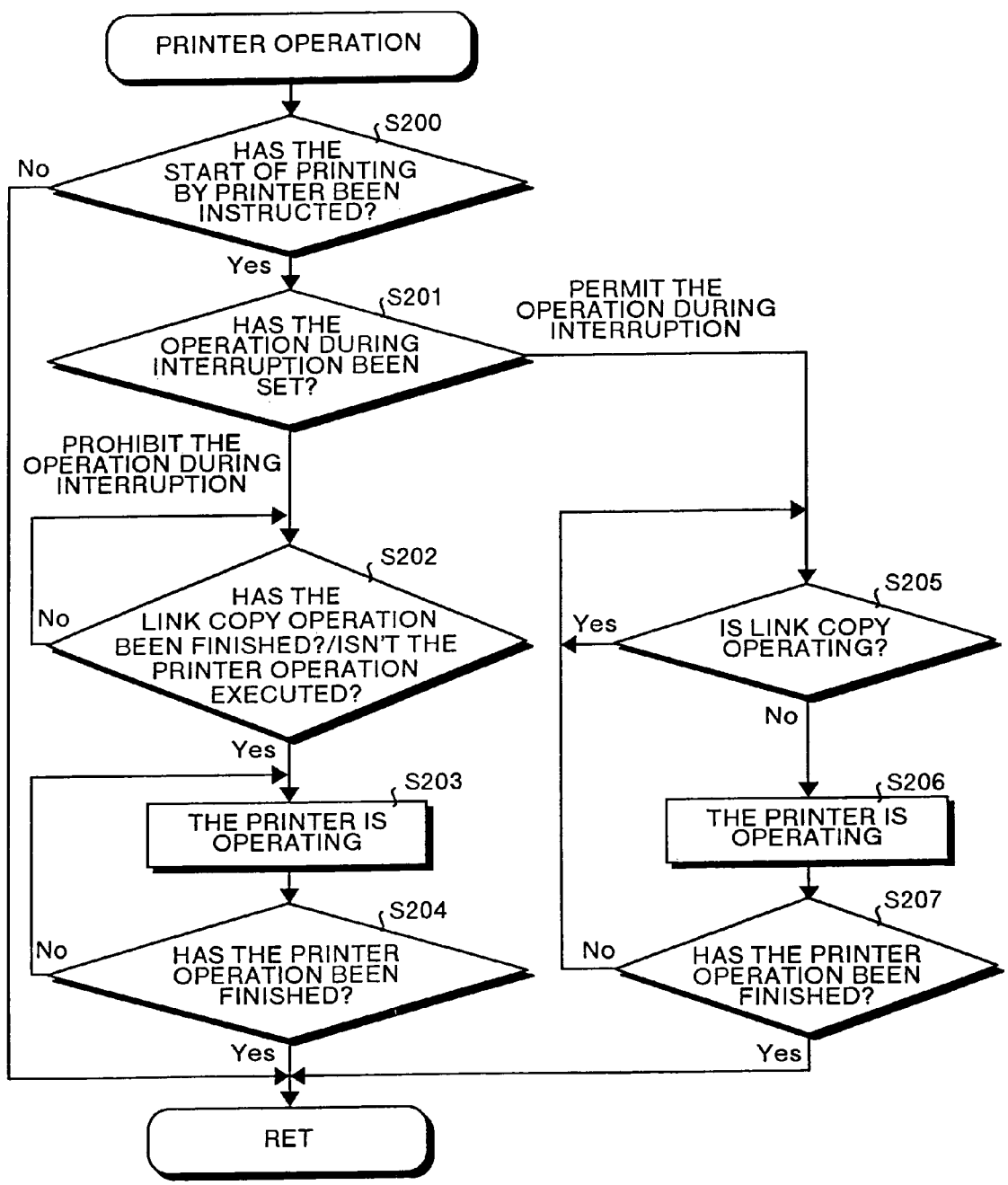
FIG. 22 is a flow chart for explanation of the example of operation (Part 1) when a print request is received during link copy operation.

In FIG. 22, when an instruction (print request) to start printing by the printer is received from the outside (step S200), the setting (See FIG. 16) of the printer operation during interruption of link copying is checked (step S201). When "Prohibit the printer operation" during interruption of link copying has been set, the process waits until the link copy operation is finished (step S202), and the printer operation is executed (step S203). When the request to interrupt the printer operation is received from the side of link copy operation after the printer starts printing, the operation is interrupted. When the request is released, the printer operation is restarted. It is then determined whether the printer operation has been finished (step S204), and when the printer operation has been finished, the process returns to a main routine not shown in the figure.

At step S201, when "Permit the printer operation" during interruption of link copying has been set, it is determined whether the link copying is operating (step S205). When the link copying is not operating, that is, when the link copying is interrupted, or the link copying is not started, the printer operation is executed (step S206). When the request to interrupt the operation is received from the side of the link copy operation after the printer starts printing, the operation is interrupted. When the request has been released, the printer operation is restarted. It is then determined whether the printer operation has been finished (step S207). When the printer operation has been finished, the process returns to the main routine not shown in the figure. By the way, images printed in the link copy mode and images printed in the printer-operation mode are output to different paper output trays, so that both of the printed images will not be mixed up.

As explained above, according to the example of the operation, even when the instruction to start printer operation is received during link copy operation, the link copy operation is continued to be executed, and the print request is put on hold (the steps S202, S205). Therefore, based on such assumption that the case where copying is executed in a plurality of machines indicates a particular case where the copying is urgently required, restriction is provided to another operation after the copy operation is started, which allows productivity of the copy operation not to be reduced.

According to the example of the operation, when the link copy operation is interrupted, it is permitted to perform printer operation during its interruption according to the setting. Therefore, another operation can be executed during its interruption, that is, while the link copying is not executed. Thus, it is possible to improve total productivity of the machine.

According to the example of the operation, when the link copy operation is interrupted, it is not permitted to perform printer operation during its interruption according to the setting. Therefore, if the same tray is used as a paper output tray, it is possible to prevent output printed paper sheets from their being mixed up, and also suppress losses due to switching between the operations.

According to the example of the operation, when the link copy operation is interrupted, whether the printer operation is permitted or not permitted for the print request from the outside can be set. Accordingly, it is possible to make settings that meet the machine usage status and the needs of the user, which allows operability to be improved.

A second example of operation of the digital copying machine configured as explained above when a link copy job conflicts with a printer job is explained below with reference to FIG. 23 to FIG. 25. In the second example of operation, the case, where a master machine and a slave machine execute different operations when the link copy job conflicts with the printer job, is explained.

First of all, the operations of the master machine and the slave machine when an instruction to execute link copying (link copy job) is received during execution of printer operation (print job) is explained with reference to FIG. 23.

Figure 23:
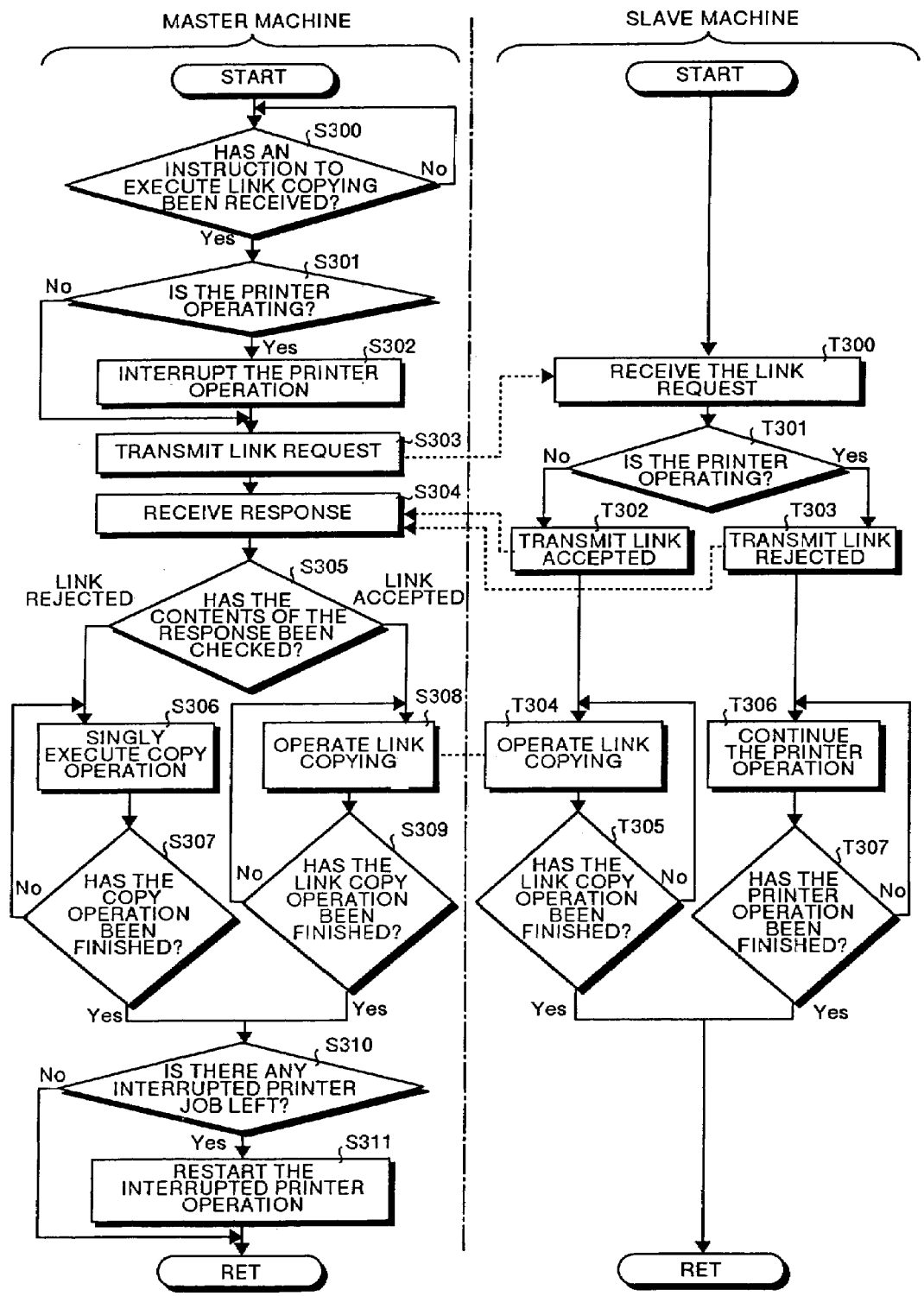
FIG. 23 is a flow chart for explanation of the example of operation (Part 2) when an instruction to start link copying is received during printer operation.

In FIG. 23, the master machine determines, when receiving an instruction to execute link copying (step S300), whether the printer is operating (step S301). As a result of this determination, when the printer is not operating, the master machine transmits a link request to a machine (slave machine) as a target to be linked (step S303). On the other hand, at step S301, when the printer is operating, the master machine interrupts the printer operation (step S302), and transmits the link request to a machine (slave machine) as a target to be linked (step S303).

The slave machine determines, when receiving the link request (step T300), whether the printer is operating (step T301). When the printer is during operation, the slave machine transmits Link Rejected to the master machine (step T303), and continues the printer operation (step T307). When the printer operation has been finished, the process returns. On the other hand, at step T301, when the slave machine determines that the printer is not operating, the slave machine transmits Link Accepted to the master machine (step T302). When receiving the response from the slave machine (step S304), the master machine determines the contents of the response (step S305). When the response is Link Accepted, the master machine and the slave machine execute the link copy operation (copy job) (step S308, step T304). When the link copy operation is finished in the slave machine (step T305), the process returns.

In the master machine, when the link copy operation is finished (step S309), the process proceeds to step S310. On the other hand, at step S305, when the response from the slave machine is Link Rejected, the master machine singly executes the copy operation for the link copy job. When the copy operation is finished (step S307), the process proceeds to step S310.

At step S310, the master machine determines whether there is any interrupted printer job left. When there is no such printer job left, the process returns. On the other hand, when there is some interrupted printer job left, the master machine restarts the interrupted printer operation (printer job) (step S311). When the printer operation is finished, the process returns. By the way, images printed in the link copy mode and images printed in the printer-operation mode are output to different paper output trays, so that both of the printed images will not be mixed up.

As explained above, according to the example of the operation, the master machine preferentially executes copy operation when receiving the instruction to start the link copying during printer operation. On the other hand, the slave machine continues to execute the printer operation even when receiving the instruction to start link copying during the printer operation. Therefore, the print job in the slave machine can be prioritized without loss in productivity of the copy operation, which makes it possible to meet the user's needs. In addition, it is possible to prevent the slave machine from its being occupied by the master machine due to link copying.

An example of operations of the master machine and the slave machine when a print request is received during execution of link copying (link copy job) is explained below with reference to FIG. 24.

Figure 24:
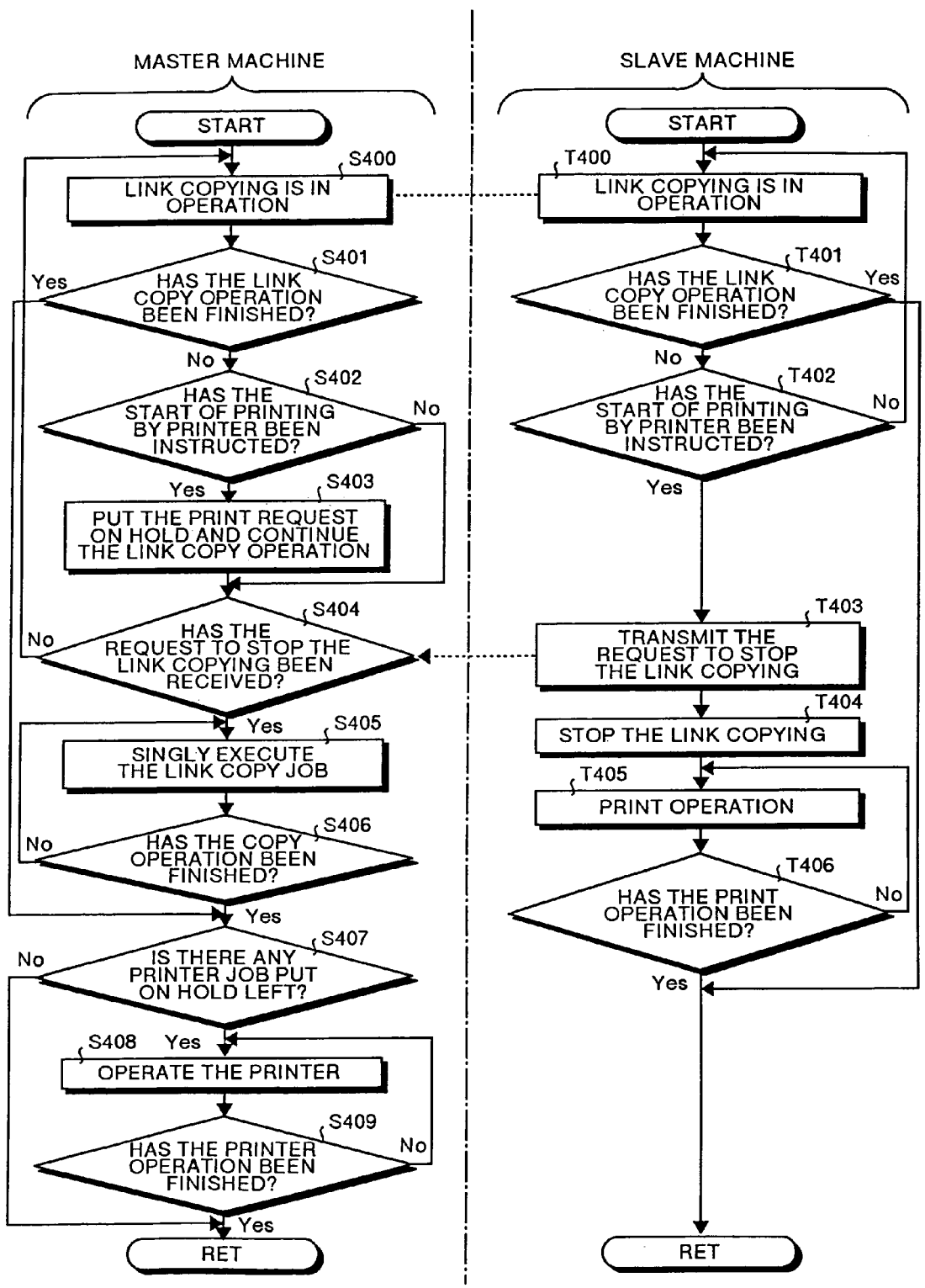
FIG. 24 is a flow chart for explanation of the example of operation (Part 2) when a print request is received during link copy operation.

In FIG. 24, the link copy operation is executed in the master machine and the slave machine (step S400, step T400) The slave machine determines whether the link copy operation has been finished (step T401). When the link copy operation has been finished, the process returns. On the other hand, when the link copy operation has not been finished, the process proceeds to step T402, where it is determined whether an instruction (print request) to start print operation by the printer has been received from the outside. As a result of this determination, when it is determined that the instruction (print request) to start print operation by the printer has not been received from the outside, the process returns to step T400. On the other hand, when it is determined that the instruction (print request) to start print operation by the printer has been received from the outside, the slave machine transmits a request to stop the link copying (step T403), and stops the link copy operation (step T404). The slave machine then executes the printer operation based on the print request (step T405), and when the printer operation has been finished, the process returns.

On the other hand, the master machine determines whether the link copy operation has been finished (step S401). When the link copy operation has been finished, the process proceeds to step S410. When the link copy operation has not been finished, on the other hand, the process proceeds to step S402, where it is determined whether an instruction (print request) to start print operation by the printer has been received from the outside. As a result of this determination, when it is determined that the instruction (print request) to start print operation by the printer has not been received from the outside, the process proceeds to step S404. On the other hand, when it is determined that the instruction (print request) to start print operation by the printer has been received from the outside, the master machine puts the print request on hold, continues the link copy operation (step S403), and proceeds to step S404.

At step S404, the master machine determines whether the request to stop the link copying has been received from the slave machine. When the request to stop the link copying has not been received from the slave machine, the process returns to step S400. On the other hand, when the request to stop the link copying has been received from the slave machine, the master machine singly executes the remaining link copy job (step S405), and when the copy operation has been finished (step S406), the process proceeds to step S407.

At step S407, the master machine determines whether there is any printer job (print request) put on hold left. When there is no such printer job left, the process returns. When there is some printer job put on hold left, the master machine executes the printer operation (printer job) according to the print request put on hold (step S408). When the printer operation has been finished (step S409), the process returns. By the way, images printed in the link copy mode and images printed in the printer-operation mode are output to different paper output trays, so that both of the printed images will not be mixed up.

As explained above, according to the example of the operation, the master machine continues to execute the link copying even when receiving the print request from the outside during the link copy operation. On the other hand, the slave machine stops, when receiving the print request from the outside during link copy operation, the link copying and preferentially executes the printer operation. Therefore, the print job in the slave machine can be prioritized without loss in productivity of the copy operation, which makes it possible to meet the user's needs. In addition, it is possible to prevent the operation of the slave machine from its being occupied by the master machine due to link copying.

Another example of operations of the master machine and the slave machine when the print request is received during execution of link copying (link copy job) is explained below with reference to FIG. 25.

Figure 25:
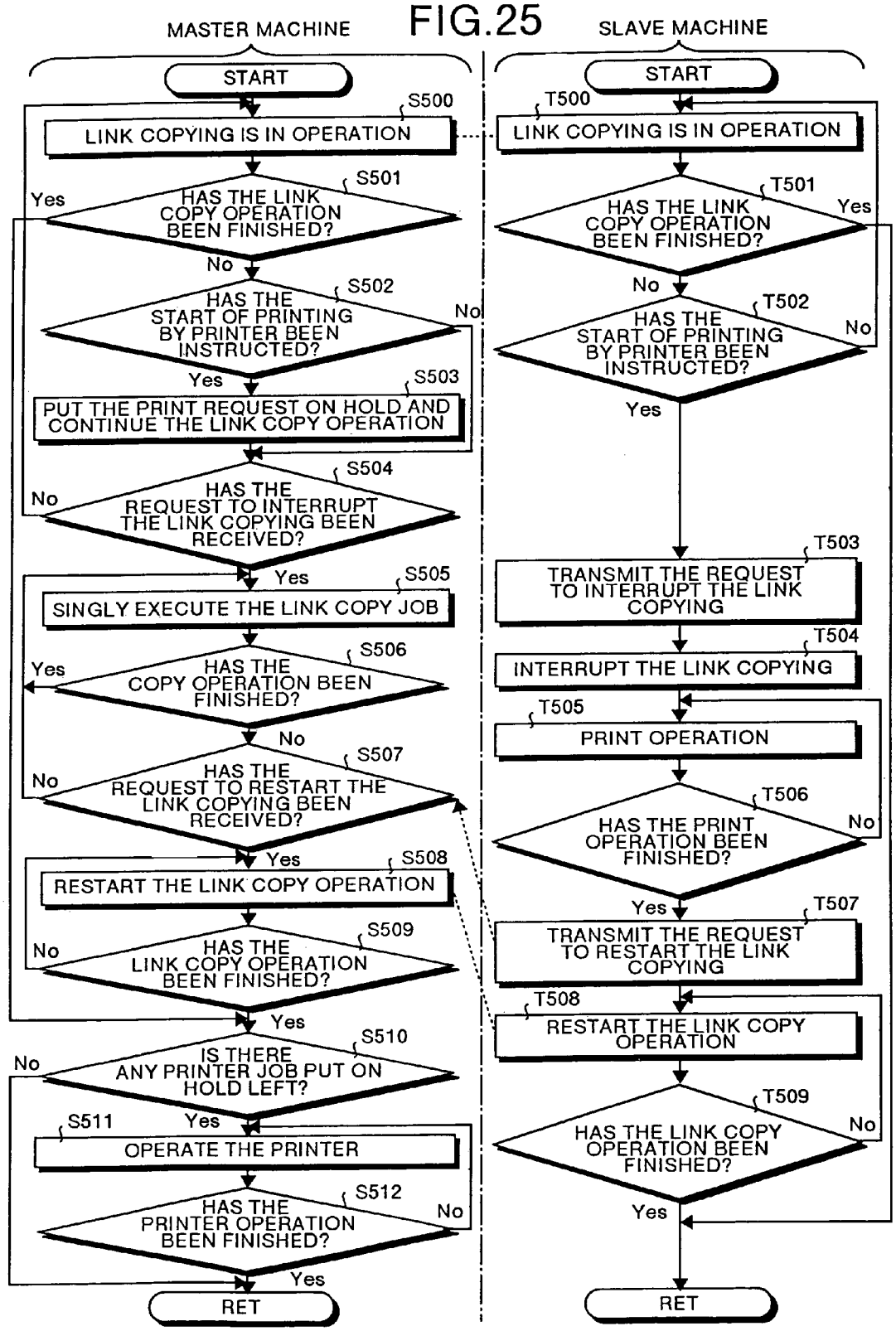
FIG. 25 is a flow chart for explanation of the example of operation (Part 3) when a print request is received during link copy operation.

In FIG. 25, the link copy operation is executed in the master machine and the slave machine (step S500, step T500) The slave machine determines whether the link copy operation has been finished (step T501). When the link copy operation has been finished, the process returns. On the other hand, when the link copy operation has not been finished, the process proceeds to step T502, where it is determined whether an instruction (print request) to start print operation by the printer has been received from the outside. As a result of this determination, when it is determined that the instruction (print request) to start print operation by the printer has not been received from the outside, the process returns to step T500. On the other hand, when it is determined that the instruction (print request) to start print operation by the printer has been received from the outside, the slave machine transmits a request to interrupt the link copying (step T503) to the master machine, and interrupts the link copy operation (step T504). The slave machine then executes the printer operation based on the print request (step T505), and when the printer operation has been finished (step T506), the process proceeds to step T507, where the slave machine transmits a request to restart the link copying to the master machine (step T507).

On the other hand, the master machine determines whether the link copy operation has been finished (step S501). When the link copy operation has been finished, the process proceeds to step S510. When the link copy operation has not been finished, on the other hand, the process proceeds to step S502, where it is determined whether an instruction (print request) to start print operation by the printer has been received from the outside. As a result of this determination, when it is determined that the instruction (print request) to start print operation by the printer has not been received from the outside, the process proceeds to step S504. On the other hand, when it is determined that the instruction (print request) to start print operation by the printer has been received from the outside, the master machine puts the print request on hold and continues the link copy operation (step S503), and proceeds to step S504.

At step S504, the master machine determines whether the request to interrupt the link copying has been received from the slave machine. When the request to interrupt the link copying has not been received from the slave machine, the process returns to step S500. On the other hand, when the request to interrupt the link copying has been received from the slave machine, the master machine singly executes the remaining link copy job (step S505). When the copy operation has been finished (step S506), the process proceeds to step S510. When the copy operation has not been finished, on the other hand, the process proceeds to step S507, where it is determined whether a request to restart the link copying has been received from the slave machine. When the request to restart the link copying has not been received from the slave machine, the process returns to step S505. When the request to restart the link copying has been received from the slave machine, on the other hand, the master machine restarts the link copying, and the master machine and the slave machine execute the remaining link copy job (step S508, T508). In the master machine, when the link copying has been finished (step S509), the process proceeds to step S510. In the slave machine, when the link copying has been finished (step T509), the process returns.

At step S510, the master machine determines whether there is any printer job (print request) put on hold left. When there is no such printer job left, the process returns. When there is such a printer job left, the master machine executes the printer operation (printer job) according to the print request put on hold (step S511). When the printer operation has been finished (step S512), the process returns. By the way, images printed in the link copy mode and images printed in the printer-operation mode are output to different paper output trays, so that both of the printed images will not be mixed up.

As explained above, according to the example of the operation, the master machine continues to execute the link copying even when receiving the print request from the outside during the link copy operation. On the other hand, the slave machine interrupts, when receiving the print request from the outside during link copy operation, the link copying and preferentially executes the printer operation. Therefore, the print job in the slave machine can be prioritized without loss in productivity of the copy operation, which makes it possible to meet the user's needs. In addition, it is possible to prevent the operation of the slave machine from its being occupied by the master machine due to link copying.

Figure 26:
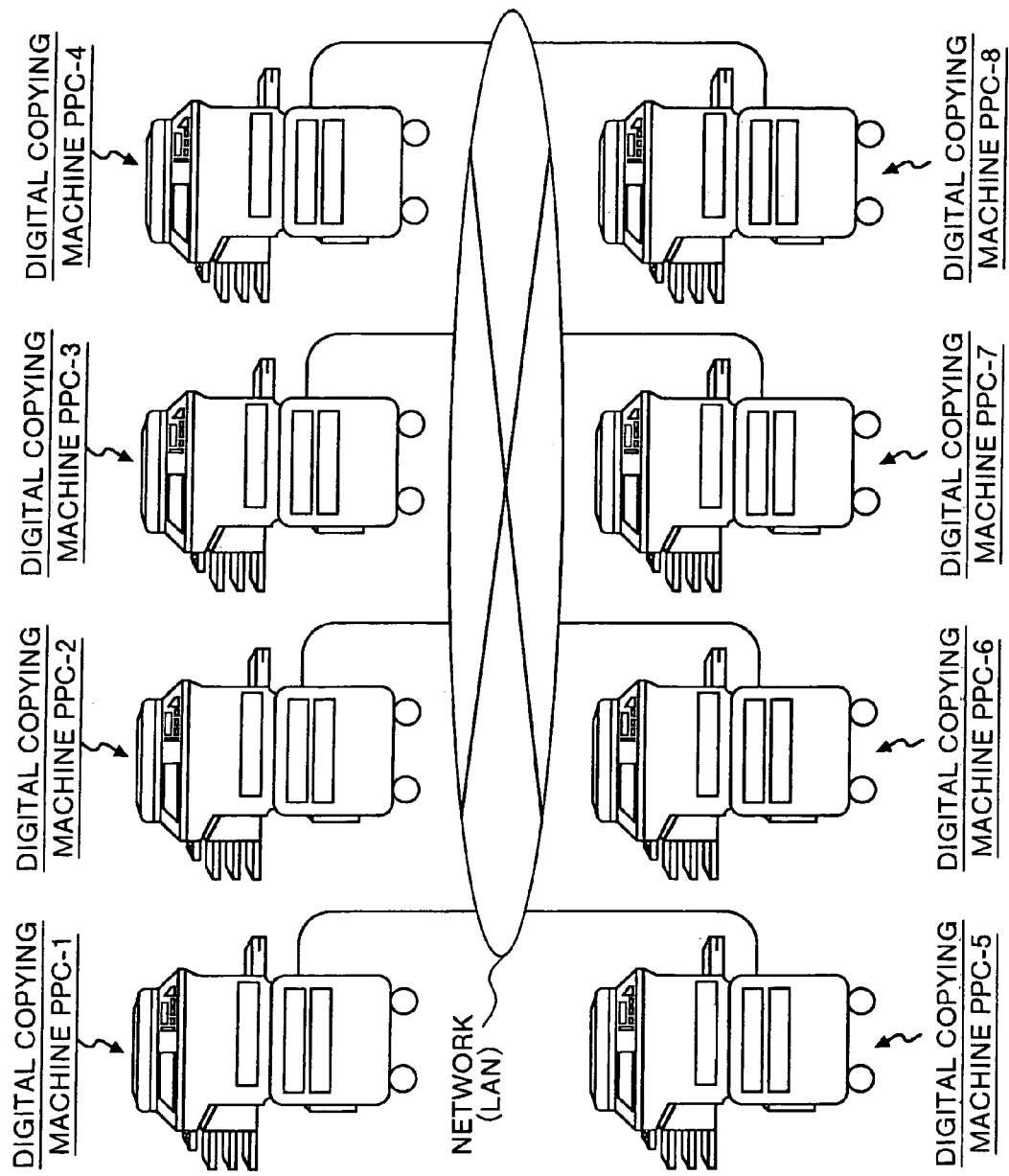
FIG. 26 shows an example of the configuration of the image formation system according to the second embodiment.

FIG. 26 shows an example of the configuration of an image formation system according to a second embodiment. In the image formation system of the first embodiment, the system in which digital copying machines are directly connected to one another is shown. However, the image formation system of the second embodiment is constructed by connecting digital copying machines to one another through a network as shown in FIG. 26. The image formation system shown in the figure is formed with a digital copying machine PPC-1 to a digital copying machine PPC-8 connected to one another through a network (LAN). Each personal computer or the like, not shown, that issues a print request is connected to each of the digital copying machine PPC-1 to the digital copying machine PPC-8 directly or through the network (LAN). Each of the digital copying machines PPC-1 to PPC-8 has the same configuration. This example of the configuration of the image formation system assumes a system in which a plurality of digital copying machines are installed at locations comparatively far from each other.

Figure 27:
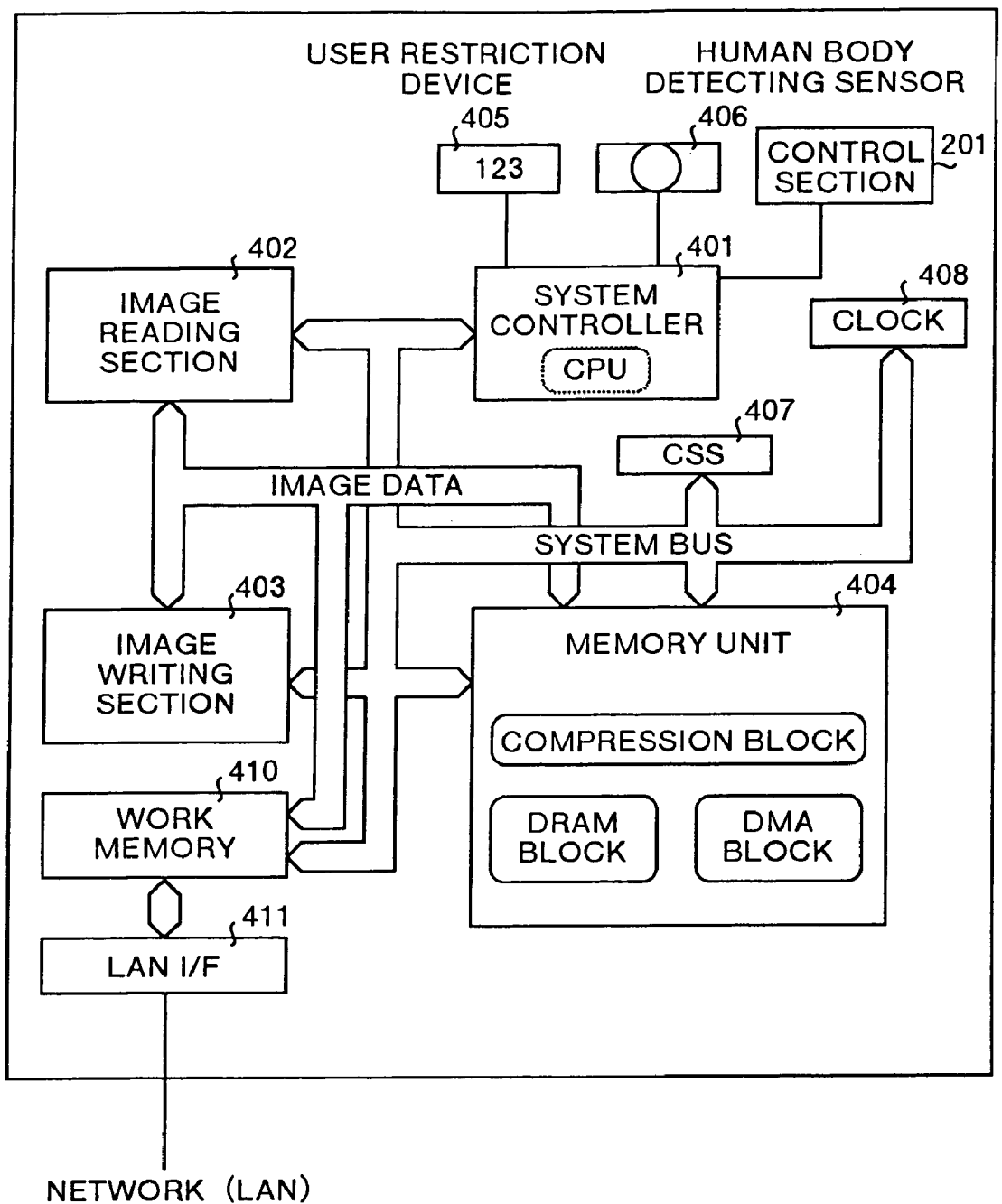
FIG. 27 shows the configuration of hardware of the digital copying machine in FIG. 26.

FIG. 27 shows a configuration of hardware of the digital copying machines PPC-1 to PPC-8 in FIG. 16. The digital copying machine shown in FIG. 27 comprises a LAN/IF 411 used to perform data communications via the network (LAN) and work memory 410 that temporarily stores image data or the like received via the network (LAN), which is a different configuration from that of the first embodiment. The remaining parts of the configuration are the same as those of the digital copying machine (FIG. 3) in the first embodiment. Therefore, explanation of the parts is omitted.

In the same manner as the digital copying machine of the first embodiment, each of the digital copying machines PPC-1 to PPC-8 has a link copy function (link copy mode) that a document is set in any of the digital copying machines and at least two units of the digital copying machines share the job of executing copy operation on the document, and a printer function (print mode) of printing according to a print request from the outside (e.g., personal computer). The operation in the case of conflict between the link copy job and the printer job is the same as that of the first embodiment, thus, explanation of the operation is omitted. The example of the configuration shown in FIG. 26 shows the system with eight digital copying machines connected to the network. However, this invention is not limited by this number, therefore, any number of units may be allowable. Further, in the example of the configuration shown in FIG. 26, the case where a LAN is used as a network is explained, but any other network may be used.

Figure 28:
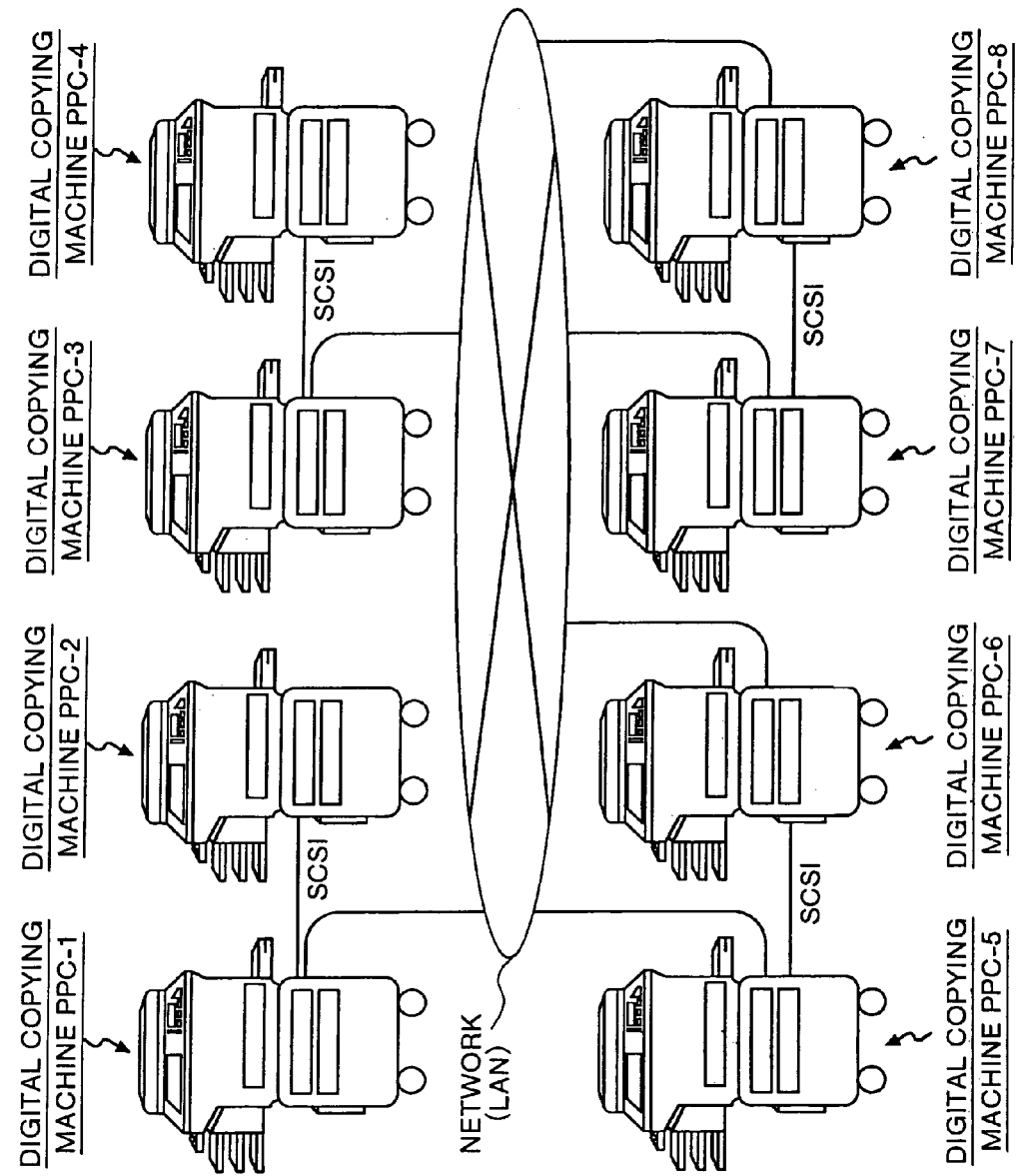
FIG. 28 shows an example of the configuration of the image formation system according to the third embodiment.

FIG. 28 shows an example of the configuration of an image formation system according to a third embodiment. In the image formation system of the first embodiment, the system in which digital copying machines are directly connected to one another is shown. In the image formation system of the second embodiment, the system in which digital copying machines are connected to one another through a network is shown. However, the image formation system of the third embodiment is constructed by connecting digital copying machines to one another directly or through a network (LAN) as shown in FIG. 28.

In the image formation system shown in FIG. 28, digital copying machines PPC-1, PPC-3, PPC-5, PPC-6, PPC-7, and PPC-8 are connected to one another through a network (LAN). Further, each pair of PPC-1 and PPC-2, PPC-3 and PPC-4, PPC-5 and PPC-6, and PPC-7 and PPC-8 is connected through a SCSI. A personal computer or the like, not shown, that issues a print request is connected to each of the digital copying machines PPC-1 to PPC-8 directly or through a network (LAN). The digital copying machines PPC-1, PPC-3, PPC-5, PPC-6, PPC-7, and PPC-8 have the same configuration, and also the digital copying machines PPC-2 and PPC-3 have the same configuration. This example of the configuration of the image formation system assumes the system in which some of digital copying machines are installed at locations close to each other and some of them are installed at locations comparatively far from one another.

Figure 29:
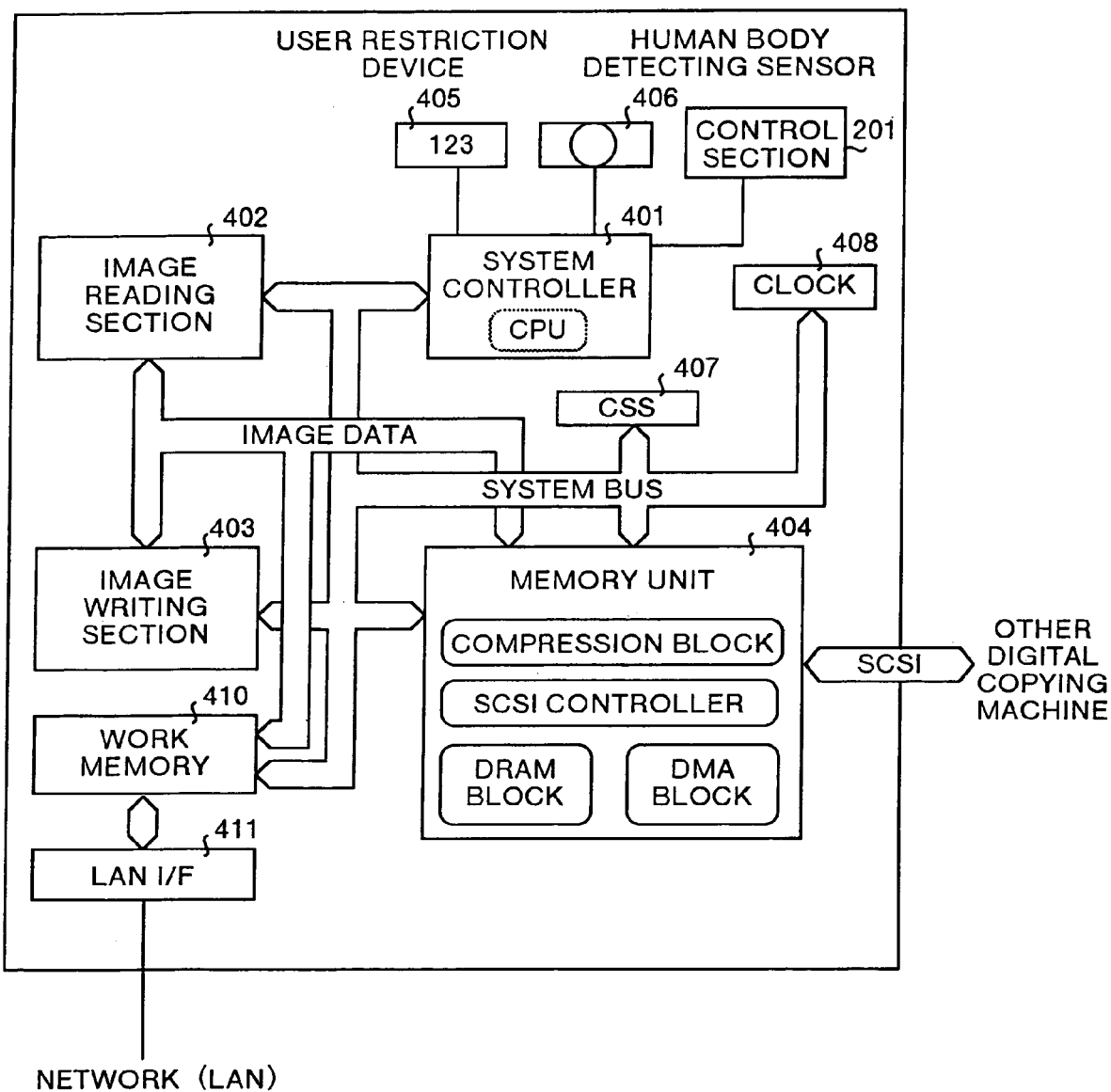
FIG. 29 shows the configuration of hardware of the digital copying machine in FIG. 28.

FIG. 29 shows a hardware configuration of the digital copying machines PPC-1, PPC-3, PPC-5, PPC-6, PPC-7, and PPC-8. The digital copying machine shown in FIG. 29 comprises the SCSI controller, the LAN/IF 410 used to perform data communications via a network (LAN), and the work memory 411 that temporarily stores image data or the like input via the network (LAN). The remaining parts of the configuration are the same as those of the digital copying machine (FIG. 3) according to the first embodiment. Therefore, explanation of the parts is omitted. Further, each of the digital copying machines PPC-2 and PPC-3 has the same configuration as that of the digital copying machine (FIG. 3) according to the first embodiment.

In the same manner as the digital copying machine of the first embodiment, each, of the digital copying machines PPC-1 to PPC-8 has a link copy function (link copy mode) that a document is set in any of the digital copying machines and at least two units of the digital copying machines share the job of executing copy operation on the document, and a printer function (print mode) of printing according to a print request from the outside (e.g., personal computer). The operation in the case of conflicts between the link copy job and the printer job is the same as that of the first embodiment, thus, explanation of the operation is omitted.

It should be noted that the present invention is not limited by the embodiments and may be embodied in modified forms without departing from the spirit of the invention.

As explained above, according to the image formation system as defined in the present invention, each of the digital copying machines has the link copy function that a document is set in one of digital copying machines and at least two units of the digital copying machines share the job of executing copy operation on the document, and the printer function of printing according to the print request from the outside. When receiving the print request from the outside during the copy operation based on the link copy function from its start to finish, the digital copying machine puts the print request on hold. Therefore, by preferentially executing the link copying, the printer operation after the link copying is started can be restricted, which allows the productivity of copy operation to be improved in consideration of the machine usage status and operation priorities of each user.

According to the image formation system as defined in the present invention when the copy operation based on the link copy function is interrupted after the operation is started and before being finished, each digital copying machine permits the printer operation for the print request from the outside during the interruption. Therefore, in addition to the effect due to the invention, when the link copying is not operating during interruption, the printer operation can be executed, which allows total productivity to be improved.

According to the image formation system as defined in the present invention when the copy operation based on the link copy function is interrupted after the operation is started and before being finished, each digital copying machine does not permit the printer operation for the print request from the outside during the interruption. Therefore, in addition to the effect due to the invention, it is possible to prevent printed paper sheets from their being mixed up if the same tray is used for paper output trays, and also suppress losses due to switching between operations.

According to the image formation system as defined in the present invention when the copy operation based on the link copy function is interrupted after the operation is started and before being finished, each digital copying machine can set permission or non-permission to execute the printer operation for the print request from the outside during the interruption. Therefore, in addition to the effect due to the invention, it is possible to make settings that meet a machine usage pattern and needs of each user, which allows operability to be improved.

According to the image formation system as defined in the present invention each digital copying machine executes the printer operation according to the print request put on hold after the copy operation based on the link copy function is finished. Therefore, in addition to the effect due to the invention, it is possible to execute printing according to the print request put on hold.

According to the digital copying machine as defined in the present invention, the digital copying machine has the link copy function that a document is set in the machine itself or another digital copying machine and at least two units of the digital copying machines share the job of executing copy operation on the document, and the printer function of printing according to a print request from the outside. When receiving the print request from the outside during the copy operation based on the link copy function from its start to finish, the digital copying machine puts the print request on hold. Therefore, by preferentially executing the link copying, the printer operation after the link copying is started can be restricted, which allows the productivity of copy operation to be improved in consideration of the machine usage status and operation priorities of each user.

According to the digital copying machine as defined in the present invention when the copy operation based on the link copy function is interrupted after the operation is started and before being finished, the digital copying machine permits printer operation for the print request from the outside during the interruption. Therefore, in addition to the effect due to the invention, when the link copying is not operating during interruption, the printer operation can be executed, which allows total productivity to be improved.

According to the digital copying machine as defined in the present invention, when the copy operation based on the link copy function is interrupted after the operation is started and before being finished, the digital copying machine does not permit printer operation for the print request from the outside during the interruption. Therefore, in addition to the effect due to the invention, it is possible to prevent printed paper sheets from their being mixed up if the same tray is used for paper output trays, and also suppress losses due to switching between operations.

According to the digital copying machine as defined in the present invention, when the copy operation based on the link copy function is interrupted after the operation is started and before being finished, the digital copying machine can set permission or non-permission to execute the printer operation for the print request from the outside during the interruption. Therefore, in addition to the effect due to the invention, it is possible to make settings that meet a machine usage pattern and needs of each user, which allows operability to be improved.

According to the digital copying machine as defined in the present invention, the digital copying machine executes the printer operation according to the print request put on hold after the copy operation based on the link copy function is finished. Therefore, in addition to the effect due to the invention, it is possible to execute printing according to the print request put on hold.

According to the image formation system according to the present invention, each digital copying machine has the link copy function that a document is set in one of digital copying machines and at least two units of the digital copying machines share the job of executing copy operation on the document, and the printer function of printing according to a print request from the outside. When the start of copy operation based on the link copy function is instructed during the printer operation according to the print request from the outside, the digital copying machine interrupts the printer operation to start the copy operation based on the link copy function. Therefore, the link copy operation can preferentially be executed even during the printer operation, which allows the productivity of copy operation to be improved in consideration of the machine usage status and operation priorities of each user.

According to the image formation system as defined in the present invention, each digital copying machine has the link copy function that a document is set in one of digital copying machines and at least two units of the digital copying machines share the job of executing copy operation on the document, and the printer function of printing according to a print request from the outside. When the start of copy operation based on the link copy function is instructed during the printer operation according to the print request from the outside, the digital copying machine waits until the printer operation is finished and starts the copy operation based on the link copy function after the printer operation is finished. Accordingly, it is possible to perform adequate screen display and operation according to variations in the operational status of the machine, which allows the productivity of copy operation to be improved in consideration of the machine usage status and operation priorities of each user.

According to the image formation system as defined in the present invention, each digital copying machine has the link copy function that a document is set in one of digital copying machines and at least two units of the digital copying machines share the job of executing copy operation on the document, and the printer function of printing according to a print request from the outside. When the start of copy operation based on the link copy function is instructed during the printer operation according to the print request from the outside, the digital copying machine displays the message to the effect that the printer is operating and also the menu screen used to instruct a following operation to be executed. When Interrupt is selected in the menu screen, the digital copying machine interrupts the printer operation to start the copy operation based on the link copy function. When Wait is selected, the digital copying machine waits until the printer operation is finished and starts the copy operation based on the link copy function after the printer operation is finished. Further, when Cancel is selected, the digital copying machine cancels the copy operation based on the link copy function. Accordingly, it is possible to set a priority between the link copying function and the printer function according to the selection by a user, which allows productivity to be improved in consideration of the machine usage status and operation priorities of each user.

According to the invention as defined in the present invention, when the printer operation according to the print request from the outside has ended during displaying of the menu screen, the digital copying machine dismisses the menu screen to start the copy operation based on the link-copy function. Therefore, in addition to the effect due to the invention, it is possible to perform adequate screen display and operation according to variations in the operational status of the machine, which allows the productivity of copy operation to be improved in consideration of the machine usage status and operation priorities of each user.

According to the digital copying machine as defined in the present invention, the digital copying machine has the link copy function that a document is set in the machine itself or another digital copying machine and at least two units of the digital copying machines share the job of executing copy operation on the document, and the printer function of printing according to a print request from the outside. When the start of copy operation based on the link copy function is instructed during the printer operation according to the print request from the outside, the digital copying machine interrupts the printer operation to start the copy operation based on the link copy function. Accordingly, it is possible to preferentially execute the link copy operation even during the printer operation, which allows the productivity of copy operation to be improved in consideration of the machine usage status and operation priorities of each user.

According to the digital copying machine as defined in the present invention, the digital copying machine has a link copy function that a document is set in the machine itself or another digital copying machine and at least two units of the digital copying machines share the job of executing copy operation on the document, and a printer function of printing according to a print request from the outside. When the start of copy operation based on the link copy function is instructed during the printer operation according to the print request from the outside, the digital copying machine waits until the printer operation is finished and starts the copy operation based on the link copy function after the printer operation is finished. Therefore, if the priority rank between the link copy operation and the printing operation is the same as each other, it is possible to equally perform both of the operations by starting the link copy operation after the printer operation is finished, which allows the productivity of copy operation to be improved in consideration of the machine usage status and operation priorities of each user.

According to the digital copying machine as defined in the present invention, the digital copying machine has the link copy function that a document is set in the machine itself or another digital copying machine and at least two units of the digital copying machines share the job of executing copy operation on the document, and the printer function of printing according to a print request from the outside. When the start of copy operation based on the link copy function is instructed during the printer operation according to the print request from the outside, the digital copying machine displays the message to the effect that the printer is operating and also the menu screen used to instruct a following operation to be executed. When Interrupt is selected in the menu screen, the digital copying machine interrupts the printer operation to start the copy operation based on the link copy function. When Wait is selected, the digital copying machine waits until the printer operation is finished and starts the copy operation based on the link copy function after the printer operation is finished. Further, when Cancel is selected, the digital copying machine cancels the copy operation based on the link copy function. Accordingly, it is possible to preferentially execute the link copy operation even during the printer operation, which allows the productivity of copy operation to be improved in consideration of the machine usage status and operation priorities of each user.

According to the digital copying machine as defined in the present invention, when the printer operation according to the print request from the outside has ended during displaying of the menu screen, the digital copying machine dismisses the menu screen to start the copy operation based on the link copy function. Accordingly, it is possible to perform adequate screen display and operation according to variations in the operational status of the machine, which allows productivity to be improved in consideration of the machine usage status and operation priorities of each user.

According to the image formation system as defined in the present invention, the master machine has the printer function of printing according to a print request from the outside, and when the start of copy operation based on the link copy function is instructed during the printer operation according to the print request from the outside, the master machine interrupts the printer operation and preferentially executes the copy operation. On the other hand, the slave machine has the printer function of printing according to a print request from the outside, and even when the start of copy operation based on the link copy function is instructed during the printer operation according to the print request from the outside, the slave machine continues to execute the printer operation. Accordingly, the print job in the slave machine can be prioritized without loss in the productivity of copy operation, which makes it possible to meet the user's needs.

According to the digital copying machine as a slave machine as defined in the present invention, the slave machine has the printer function of printing according to a print request from the outside, and even when the start of copy operation based on the link copy function is instructed during the printer operation according to the print request from the outside, the slave machine continues to execute the printer operation. Accordingly, the print job in the slave machine can be prioritized, which makes it possible to meet the user's need.

According to the image formation system as defined in the present invention, the master machine has the printer function of printing according to a print request from the outside, and when receiving the print request from the outside during the copy operation based on the link copy function from its start to finish, the master machine puts the print request on hold. On the other hand, the slave machine has the printer function of printing according to a print request from the outside, and when receiving the print request from the outside during the copy operation based on the link copy function from its start to finish, the slave machine preferentially executes the printer operation according to the print request. Accordingly, the print job in the slave machine can be prioritized without loss in the productivity of copy operation, which makes it possible to meet the user's needs.

According to the digital copying machine as a slave machine as defined in the present invention, the slave machine has the printer function of printing according to a print request from the outside, and when receiving the print request from the outside during the copy operation based on the link copy function from its start to finish, the slave machine preferentially executes the printer operation according to the print request. Accordingly, the print job in the slave machine can be prioritized, which makes it possible to meet the user's need.

According to the image formation system as defined in the present invention, the master machine has the printer function of printing according to a print request from the outside, and when receiving the print request from the outside during the copy operation based on the link copy function from its start to finish, the master machine puts the print request on hold. On the other hand, the slave machine has the printer function of printing according to a print request from the outside, and when receiving the print request from the outside during the copy operation based on the link copy function from its start to finish, the slave machine stops the copy operation and executes printer operation according to the print request. Accordingly, the print job in the slave machine can be prioritized without loss in the productivity of copy operation, which makes it possible to meet the user's needs.

According to the digital copying machine as a slave machine as defined in the present invention, the slave machine has the printer function of printing according to a print request from the outside, and when receiving the print request from the outside during the copy operation based on the link copy function from its start to finish, the slave machine stops the copy operation and executes the printer operation according to the print request. Accordingly, the print job in the slave machine can be prioritized, which makes it possible to meet the user's needs.

According to the image formation system as defined in the present invention, the master machine has the printer function of printing according to a print request from the outside, and when receiving the print request from the outside during the copy operation based on the link copy function from its start to finish, the master machine puts the print request on hold. On the other hand, the slave machine has the printer function of printing according to a print request from the outside, and when receiving the print request from the outside during the copy operation based on the link copy function from its start to finish, the slave machine interrupts the copy operation and executes the printer operation according to the print request. Accordingly, the print job in the slave machine can be prioritized without loss in the productivity of copy operation, which makes it possible to meet the user's needs.

According to the digital copying machine as a slave machine as defined in the present invention, the slave machine has the printer function of printing according to a print request from the outside, and when receiving the print request from the outside during the copy operation based on the link copy function from its start to finish, the slave machine interrupts the copy operation and executes the printer operation according to the print request. Accordingly, the print job in the slave machine can be prioritized, which makes it possible to meet the user's needs.

According to the image formation system as defined in the present invention, each digital copying machine outputs images printed by printer operation and images printed by copy operation based on the link copy function to different paper output sections. Accordingly, it is possible to prevent images printed by link copying and images printed by the print request from their being mixed up.

According to the image formation system as defined in the present invention, at least two units of digital copying machine are directly connected to each other. Accordingly, this invention is adequate for the case where a comparatively small scaled system is constructed.

According to the image formation system as defined in the present invention, at least two units of digital copying machine are connected to each other through a network. Accordingly, this invention is adequate for the case where a comparatively large scaled system is constructed.

According to the digital copying machine as defined in the present invention, the digital copying machine outputs images printed by printer operation and images printed by copy operation based on the link copy function to different paper output sections. Accordingly, it is possible to prevent images printed by link copying and images printed by the print request from their being mixed up.

According to the digital copying machine as defined in the present invention, the digital copying machine is directly connected to at least another one of digital copying machines. Accordingly, this invention is adequate for the case where a comparatively small scaled system is constructed.

According to the digital copying machine as defined in the present invention, the digital copying machine is connected to at least another one of digital copying machines through a network. Accordingly, this invention is adequate for the case where a comparatively large scaled system is constructed.

According to the digital copying machine as a slave machine as defined in the present invention, the slave machine outputs images printed by printer operation and images printed by copy operation based on the link copy function to different paper output sections. Accordingly, it is possible to prevent images printed by link copying and images printed by the print request from their being mixed up.

According to the digital copying machine as a slave machine as defined in the present invention, the slave machine is directly connected to the master machine. Accordingly, this invention is adequate for the case where a comparatively small scaled system is constructed.

According to the digital copying machine as a slave machine as defined in the present invention, the slave machine is connected to the master machine through a network. Accordingly, this invention is adequate for the case where a comparatively large scaled system is constructed.

The present document incorporates by reference the entire contents of Japanese priority documents, 11-280716 filed in Japan on Sep. 30, 1999 and 2000-270836 filed in Japan on Sep. 6, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image formation system comprising at least two units of digital copying machines including a master machine and a slave machine connected to each other, each of which has a link copy function where the master machine scans an image of a document as an object to be copied and transfers the image of the scanned document to the slave machine, and where said master machine and said slave machine share the job of printing the scanned document image, wherein said master machine is configured to perform a printer function of printing according to a print request from an outside device, and when receiving the print request from said outside device during a link copy operation based on the link copy function during a time between a start moment to an end moment of the link copy function, the master machine puts the print request on hold and continues t-he-said link copy operation, and when the master machine receives a request to interrupt @, e-said link copy operation from the slave machine, the master machine executes the link copy function on its own, said master machine is further configured to transmit a link request to the slave machine to request the slave machine whether or not it is capable of participating in said link copy operation, and upon a response from the slave machine, the master machine accepts said link copy operation and shares data required to the slave machine to perform said link copy operation, and said slave machine is configured to perform the printer function of printing according to the print request from the outside device, and when receiving the print request from said outside device during said link copy operation based on the link copy function during a time between the start moment to the end moment of the link copy function, the slave machine transmits a request to interrupt the link copying to the master machine, interrupts said link copy operation, and executes a printer operation according to the print request, when the slave machine determines the printer operation is finished, the slave machine transmits a request to restart said link copy operation to the master machine, if said link copy operation is not finished, both the master machine and the slave machine re-execute said link copy operation, and when the master machine determines said link copy operation is finished and there is the print request left on hold, the master machine starts the printer operation.

2. The image formation system according to claim 1, wherein each of said digital copying machines outputs images printed by printer operation and images printed by copy operation based on the link copy function to different paper output sections.

3. The image formation system according to claim 1, wherein at least two units of said digital copying machines are directly connected to each other.

4. The image formation system according to claim 1, wherein at least two units of said digital copying machines are connected to each other through a network.

5. The image formation system according to claim 1, wherein each of the digital copying machines comprises a memory unit connected to a system controller via a system bus and configured to store a data of the image locally in the digital copying machine, said memory unit further comprises:
- at least two compression units, configured to compress said data; and
- at least two storage units, configured to store said compressed data received from said at least two compression units via a local bus in said memory unit and not via said system bus
- at least two local buses;
- wherein said compression units are able to perform a compression and a decompression of said data, said storage units being directly connected to said compression units corresponding thereto with said local buses, allowing an external device to perform a parallel data storage and data retrieval from said memory unit.

6. The image formation system according to claim 1, wherein each of the digital copying machines comprises a memory unit connected to a system controller via a system bus and configured to store a data of the image locally in the digital copying machine, said memory unit further comprises:
- a compression unit, configured to compress said data;
- a storage unit, configured to store said compressed data received from said compression unit via a local bus in said memory unit and not via said system bus; and
- an image synthesis section, configured to synthesize image data and image data already stored in said storage unit to form an image.

7. The image formation system according to claim 1, wherein at least one of the digital copying machines further includes:
- a user interface configured to display a status of the at least two units of digital copying machines, and configured to enable a user to select at least one of the at least two units for job assignments to the selected units;
- wherein the user interface is configured to inform the user about which of the at least two units of digital copying machines are performing the copy operation of the link copy function and which of the at least two units are not performing the copy operation of the link copy function;
- and the user interface is further configured to enable a user to select at least one of the at least two units that are not performing the copy operation of the link copy function, so that the print request from the outside device can be performed by the selected ones of the at least two units of digital copying machines.

* * * * *